US012649542B2

(12) United States Patent
Kimura et al.

(10) Patent No.: US 12,649,542 B2
(45) Date of Patent: Jun. 9, 2026

(54) CONTROL DEVICE FOR HUMAN-POWERED VEHICLE AND TRANSMISSION SYSTEM FOR HUMAN-POWERED VEHICLE

(71) Applicant: Shimano Inc., Sakai (JP)

(72) Inventors: Masatoshi Kimura, Sakai (JP); Kazumasa Mitsunari, Sakai (JP)

(73) Assignee: Shimano Inc., Osaka (JP)

( * ) Notice: Subject to any disclaimer, the term of this patent is extended or adjusted under 35 U.S.C. 154(b) by 115 days.

(21) Appl. No.: 18/440,153

(22) Filed: Feb. 13, 2024

(65) Prior Publication Data

US 2024/0300619 A1      Sep. 12, 2024

(30) Foreign Application Priority Data

Mar. 9, 2023    (JP) ................................. 2023-036386

(51) Int. Cl.
| | |
|---|---|
| *B62M 6/45* | (2010.01) |
| *B62M 9/122* | (2010.01) |
| *B62M 9/132* | (2010.01) |
| *B62M 25/08* | (2006.01) |

(52) U.S. Cl.
CPC .............. *B62M 25/08* (2013.01); *B62M 6/45* (2013.01); *B62M 9/122* (2013.01); *B62M 9/132* (2013.01)

(58) Field of Classification Search
CPC ........ B62M 6/45; B62M 9/122; B62M 9/123; B62M 9/132; B62M 9/133
See application file for complete search history.

(56) References Cited

U.S. PATENT DOCUMENTS

| | | | | |
|---|---|---|---|---|
| 9,896,152 | B2 * | 2/2018 | Yamamoto | ............. B62M 9/122 |
| 9,896,156 | B2 * | 2/2018 | Gao | ...................... F16H 61/702 |
| 10,227,106 | B2 * | 3/2019 | Tsuchizawa | ............ B60L 3/106 |
| 10,562,533 | B2 * | 2/2020 | Tsuchizawa | ........... B60W 10/11 |
| 10,618,600 | B2 * | 4/2020 | Lin | ......................... B62M 9/132 |
| 10,836,453 | B2 * | 11/2020 | Tsuchizawa | ...... F16H 61/66236 |
| 10,913,511 | B2 * | 2/2021 | Iino | .......................... B62M 6/45 |
| 11,015,705 | B2 * | 5/2021 | Ho | .......................... B62K 23/02 |
| 12,145,402 | B2 * | 11/2024 | Yamazaki | .............. G01D 5/245 |
| 2014/0290412 | A1 | 10/2014 | Emura et al. | |
| 2019/0202525 | A1 * | 7/2019 | Shahana | .................. B62M 6/50 |
| 2024/0174318 | A1 * | 5/2024 | Van Druten | ........... B62M 25/08 |

FOREIGN PATENT DOCUMENTS

| | | | | |
|---|---|---|---|---|
| DE | 102010017412 A1 * | 12/2011 | ............. | B62M 6/45 |
| EP | 1129933 A2 * | 9/2001 | ........... | B62M 11/04 |
| WO | WO-2022200460 A2 * | 9/2022 | ........... | B62M 25/08 |

* cited by examiner

*Primary Examiner* — Sherry L Estremsky
(74) *Attorney, Agent, or Firm* — Spencer Fane, LLP

(57) ABSTRACT

A control device is provided for a human-powered vehicle. The control device includes an electronic controller configured to control a motor assisting in propulsion of the human-powered vehicle. The electronic controller is configured to execute a first operation for changing an output of the motor in a case where at least one of a first transmission device and a second transmission device performs a shifting action for shifting a transmission ratio of the human-powered vehicle. Further, the electronic controller is configured to execute a second operation for changing the transmission ratio through a predetermined shifting sequence involving a combination of the shifting action of the first transmission device and the shifting action of the second transmission device.

18 Claims, 7 Drawing Sheets

Fig.3

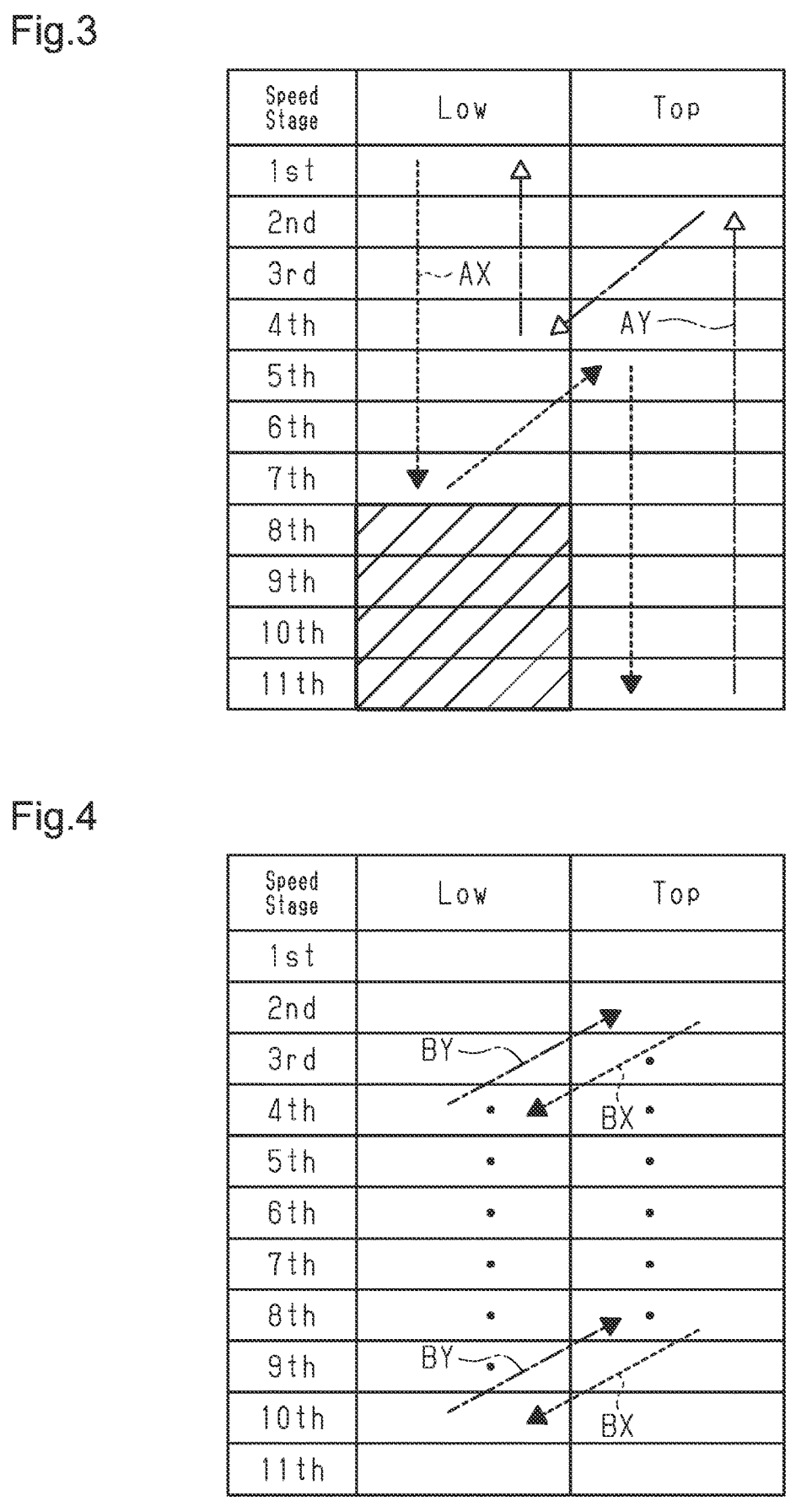

| Speed Stage | Low | Top |
|---|---|---|
| 1st | | |
| 2nd | | |
| 3rd | AX | |
| 4th | | AY |
| 5th | | |
| 6th | | |
| 7th | | |
| 8th | | |
| 9th | | |
| 10th | | |
| 11th | | |

Fig.4

| Speed Stage | Low | Top |
|---|---|---|
| 1st | | |
| 2nd | | |
| 3rd | BY | |
| 4th | | BX |
| 5th | | |
| 6th | | |
| 7th | | |
| 8th | | |
| 9th | BY | |
| 10th | | BX |
| 11th | | |

Fig.6

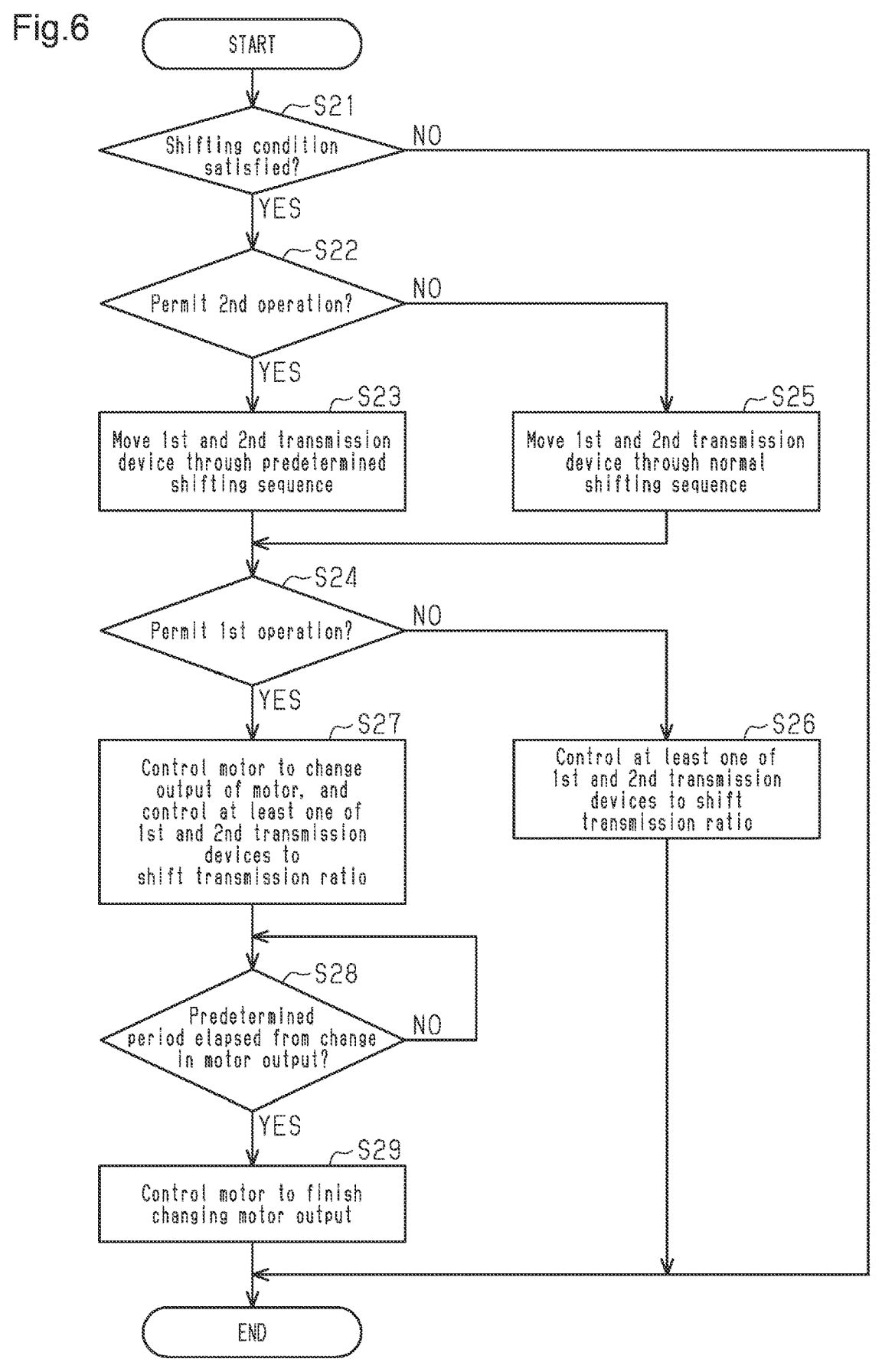

START

⌐S21

Shifting condition
satisfied?                    NO

YES

⌐S22

Permit 2nd operation?          NO

YES

⌐S23

Move 1st and 2nd transmission
device through predetermined
shifting sequence

⌐S25

Move 1st and 2nd transmission
device through normal
shifting sequence

⌐S24

Permit 1st operation?          NO

YES

⌐S27

Control motor to change
output of motor, and
control at least one of
1st and 2nd transmission
devices to
shift transmission ratio

⌐S26

Control at least one of
1st and 2nd transmission
devices to shift
transmission ratio

⌐S28

Predetermined
period elapsed from change    NO
in motor output?

YES

⌐S29

Control motor to finish
changing motor output

END

CONTROL DEVICE FOR HUMAN-POWERED VEHICLE AND TRANSMISSION SYSTEM FOR HUMAN-POWERED VEHICLE

CROSS-REFERENCE TO RELATED APPLICATIONS

This application claims priority to Japanese Patent Application No. 2023-036386, filed on Mar. 9, 2023. The entire disclosure of Japanese Patent Application No. 2023-036386 is hereby incorporated herein by reference.

BACKGROUND

Technical Field

The present disclosure generally relates to a control device for a human-powered vehicle and a transmission system for a human-powered vehicle.

Background Information

U.S. Patent Application Publication No. 2014/0290412 describes an example of a controller configured to control a first transmission device and a second transmission device in coordination.

SUMMARY

It is an objective of the present disclosure to provide a control device for a human-powered vehicle and a transmission system for a human-powered vehicle that allow shifting to be performed in a preferred manner.

A control device in accordance with a first aspect of the present disclosure is for a human-powered vehicle. The control device comprises an electronic controller configured to control a motor assisting in propulsion of the human-powered vehicle. The electronic controller is configured to execute a first operation for changing an output of the motor in a case where at least one of a first transmission device and a second transmission device performs a shifting action for shifting a transmission ratio of the human-powered vehicle, and the electronic controller is configured to execute a second operation for shifting the transmission ratio through a predetermined shifting sequence involving a combination of the shifting action of the first transmission device and the shifting action of the second transmission device.

With the control device in accordance with the first aspect, the first operation and the second operation can both be performed. This allows shifting to be performed in a preferred manner.

In accordance with a second aspect of the present disclosure, in the control device according to the first aspect, the electronic controller is configured to restrict execution of one of the first operation and the second operation in a case where the electronic controller is configured to execute the other one of the first operation and the second operation.

With the control device in accordance with the second aspect, in a case where the electronic controller executes one of the first operation and the second operation, the other one of the first operation and the second operation is restricted. This reduces situations in which the motor, the first transmission device, and the second transmission device are all actuated in a case where shifting is performed.

In accordance with a third aspect of the present disclosure, in the control device according to the first or second aspect, the electronic controller is configured to restrict execution of the second operation in a case where the electronic controller is configured to execute the first operation.

With the control device in accordance with the third aspect, execution of the second operation is restricted in a case where the first operation is executed.

In accordance with a fourth aspect of the present disclosure, in the control device according to any one of the first to third aspects, the electronic controller is configured to restrict execution of the second operation based on a first condition in a case where the electronic controller is configured to execute the first operation.

With the control device in accordance with the fourth aspect, in a case where the electronic controller executes the first operation, the electronic controller can restrict execution of the second operation in a preferred manner based on the first condition.

In accordance with a fifth aspect of the present disclosure, in the control device according to the first or second aspect, the electronic controller is configured to permit execution of the second operation based on a second condition in a case where the electronic controller is configured to execute the first operation.

With the control device in accordance with the fifth aspect, in a case where the electronic controller executes the first operation, the electronic controller can execute the second operation in a preferred manner based on the second condition.

In accordance with a sixth aspect of the present disclosure, in the control device according to the fourth aspect, the first condition includes at least one of a traveling state and an operating state of the human-powered vehicle, and the traveling state of the human-powered vehicle includes at least one of a rotational speed of a crank axle of the human-powered vehicle, a human driving force input to the crank axle, and a vehicle speed.

With the control device in accordance with the sixth aspect, in a case where the electronic controller executes the first operation, the electronic controller restricts execution of the second operation based on at least one of the traveling state of the human-powered vehicle and the operating state of the human-powered vehicle. The traveling state includes at least one of the rotational speed of the crank axle of the human-powered vehicle, the human driving force input to the crank axle, and the vehicle speed.

In accordance with a seventh aspect of the present disclosure, in the control device according to the fifth aspect, the second condition includes at least one of a traveling state and an operating state of the human-powered vehicle, and the traveling state of the human-powered vehicle includes at least one of a rotational speed of a crank axle of the human-powered vehicle, a human driving force input to the crank axle, and a vehicle speed.

With the control device in accordance with the seventh aspect, in a case where the electronic controller is able to execute the first operation, the electronic controller executes the second operation based on at least one of the traveling state of the human-powered vehicle and the operating state of the human-powered vehicle. The traveling state includes at least one of the rotational speed of the crank axle of the human-powered vehicle, the human driving force input to the crank axle, and the vehicle speed.

In accordance with an eighth aspect of the present disclosure, in the control device according to the first aspect, the electronic controller is configured to selectively restrict execution of the second operation and permit execution of the second operation based on a signal from an operating unit operable by a user in a case where the electronic controller is configured to execute the first operation.

With the control device in accordance with the eighth aspect, in a case where the electronic controller is able to execute the first operation, the electronic controller can select whether to restrict or permit execution of the second operation based on operation of the operating unit by the user.

In accordance with a ninth aspect of the present disclosure, in the control device according to the first aspect, the electronic controller is configured to selectively restrict execution of the second operation and permit execution of the second operation in a case where the electronic controller is configured to execute the first operation. The electronic controller is configured to permit execution of the second operation in a case where the second operation is executed to decrease the transmission ratio.

With the control device in accordance with the ninth aspect, in a case where the electronic controller is able to execute the first operation, the electronic controller can execute the second operation to decrease the transmission ratio.

In accordance with a tenth aspect of the present disclosure, in the control device according to the ninth aspect, the first transmission device is a front derailleur, and the electronic controller is configured to permit execution of the second operation in a case where execution of the second operation will cause the first transmission device to perform a shifting action that moves the first transmission device toward the human-powered vehicle.

With the control device in accordance with the tenth aspect, in a case where the electronic controller is able to execute the first operation, the electronic controller can execute the second operation so that the first transmission device performs a shifting action that moves the first transmission device toward the human-powered vehicle.

In accordance with an eleventh aspect of the present disclosure, in the control device according to the ninth aspect, the electronic controller is configured to permit execution of the second operation in a case where, in the second operation, the first transmission device does not perform a shifting action and the second transmission device performs a shifting action.

With the control device in accordance with the eleventh aspect, in a case where the electronic controller is able to execute the first operation, the electronic controller can execute the second operation in which the first transmission device does not perform a shifting action and the second transmission device performs a shifting action.

In accordance with a twelfth aspect of the present disclosure, in the control device according to any one of the first to eleventh aspects, one of the first transmission device and the second transmission device is an internal geared hub, and the other one of the first transmission device and the second transmission device is a derailleur.

With the control device in accordance with the twelfth aspect, in a case where at least one of the internal geared hub and the derailleur performs a shifting action, the electronic controller can execute the first operation that changes the output of the motor and the second operation that shifts the transmission ratio through a predetermined shifting sequence involving a combination of the shifting action of the first transmission device and the shifting action of the second transmission device.

In accordance with a thirteenth aspect of the present disclosure, in the control device according to the twelfth aspect, the first transmission device is a rear internal geared hub that is configured to be provided in a hub of a rear wheel, and the second transmission device is a rear derailleur.

With the control device in accordance with the thirteenth aspect, in a case where at least one of the internal geared hub and the rear derailleur performs a shifting action, the electronic controller can execute the first operation that changes the output of the motor and the second operation that shifts the transmission ratio through a predetermined shifting sequence involving a combination of the shifting action of the rear internal geared hub and the shifting action of the rear derailleur.

In accordance with a fourteenth aspect of the present disclosure, in the control device according to the first aspect, the electronic controller is configured to selectively restrict execution of the second operation and permit execution of the second operation in a case where the electronic controller is configured to execute the first operation. The electronic controller is configured to permit execution of the second operation in a case where a vehicle speed is greater than or equal to a predetermined vehicle speed.

With the control device in accordance with the fourteenth aspect, in a case where the electronic controller is able to execute the first operation, the electronic controller can execute the second operation in a case where the vehicle speed is greater than or equal to the predetermined vehicle speed.

In accordance with a fifteenth aspect of the present disclosure, in the control device according to the fourteenth aspect, the electronic controller is configured to control the motor so that the motor stops in a case where the vehicle speed is greater than or equal to the predetermined vehicle speed.

With the control device in accordance with the fifteenth aspect, the electronic controller stops the motor in a case where the vehicle speed is greater than or equal to the predetermined vehicle speed. Thus, the motor will not apply propulsion force to the human-powered vehicle in a case where the vehicle speed is greater than or equal to the predetermined vehicle speed.

A transmission system in accordance with a sixteenth aspect of the present disclosure is for a human-powered vehicle. The transmission system comprises a first transmission device, a second transmission device, and the control device according to any one of the first to fifteenth aspects.

With the transmission system in accordance with the sixteenth aspect, the first operation and the second operation can both be performed. This allows shifting to be performed in a preferred manner.

A transmission system in accordance with a seventeenth aspect of the present disclosure is for a human-powered vehicle. The transmission system comprises a first transmission device, a second transmission device, a motor configured to assist in propulsion of the human-powered vehicle, and an electronic controller configured to control the motor. The electronic controller is configured to execute a first operation for changing an output of the motor in a case where at least one of the first transmission device and the second transmission device performs a shifting action for shifting a transmission ratio of the human-powered vehicle, and the electronic controller is configured to execute a second operation for shifting the transmission ratio through a predetermined shifting sequence involving a combination of the shifting action of the first transmission device and the shifting action of the second transmission device.

With the transmission system in accordance with the seventeenth aspect, the first operation and the second operation can both be performed. This allows shifting to be performed in a preferred manner.

In accordance with an eighteenth aspect of the present disclosure, in the transmission system according to the seventeenth aspect, the electronic controller is configured to restrict execution of one of the first operation and the second operation in a case where the electronic controller is configured to execute the other one of the first operation and the second operation.

With the transmission system in accordance with the eighteenth aspect, in a case where the electronic controller executes one of the first operation and the second operation, the other one of the first operation and the second operation is restricted. This reduces situations in which the motor, the first transmission device, and the second transmission device are all actuated in a case where shifting is performed.

In accordance with a nineteenth aspect of the present disclosure, in the transmission system according to the seventeenth or eighteenth aspect, the first transmission device is a front derailleur or a rear internal geared hub that is configured to be provided in a hub of a rear wheel.

With the transmission system in accordance with the nineteenth aspect, the transmission system including the front derailleur performs shifting in a preferred manner.

In accordance with a twentieth aspect of the present disclosure, in the transmission system according to the seventeenth or eighteenth aspect, the second transmission device is a rear derailleur.

With the transmission system in accordance with the twentieth aspect, the transmission system including the rear derailleur performs shifting in a preferred manner.

The control device for a human-powered vehicle and the transmission system for a human-powered vehicle in accordance with the present disclosure allow shifting to be performed in a preferred manner.

BRIEF DESCRIPTION OF THE DRAWINGS

Referring now to the attached drawings which form a part of this original disclosure, an illustrative embodiment is shown.

FIG. 3 is a chart illustrating one example of a first shifting pattern used in a first operation (a first shifting control operation) executed by an electronic controller shown in FIG. 2.

FIG. 4 is a chart illustrating one example of a second shifting pattern used in a second operation (a second shifting control operation) executed by the electronic controller shown in FIG. 2.

FIG. 6 is a flowchart of a control process executed by the electronic controller shown in FIG. 2 to control a first transmission device, a second transmission device, and a motor.

DETAILED DESCRIPTION

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
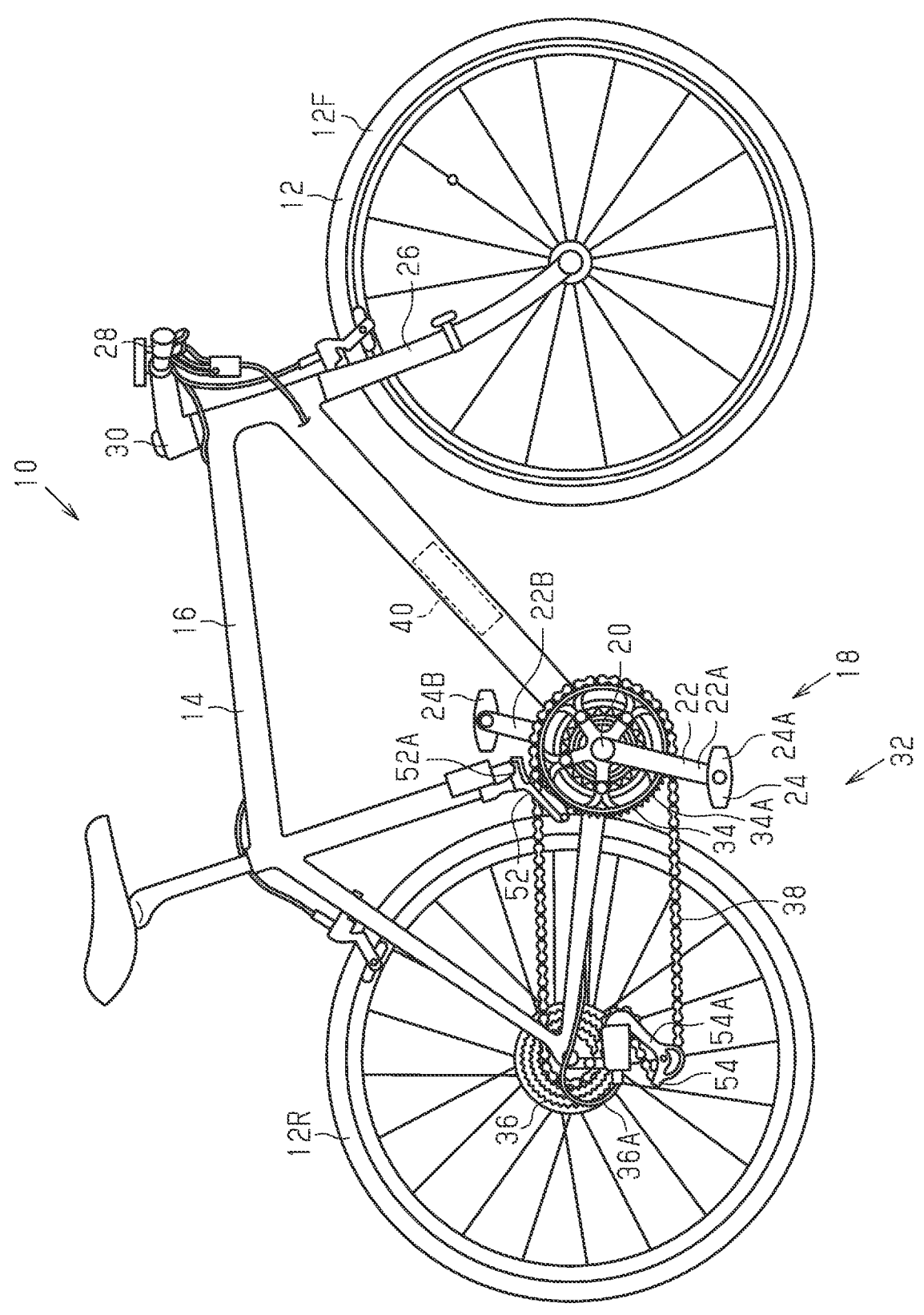
FIG. 1 is a side elevational view of a human-powered vehicle including a control device and a transmission system in accordance with a first embodiment.
Figure 2:
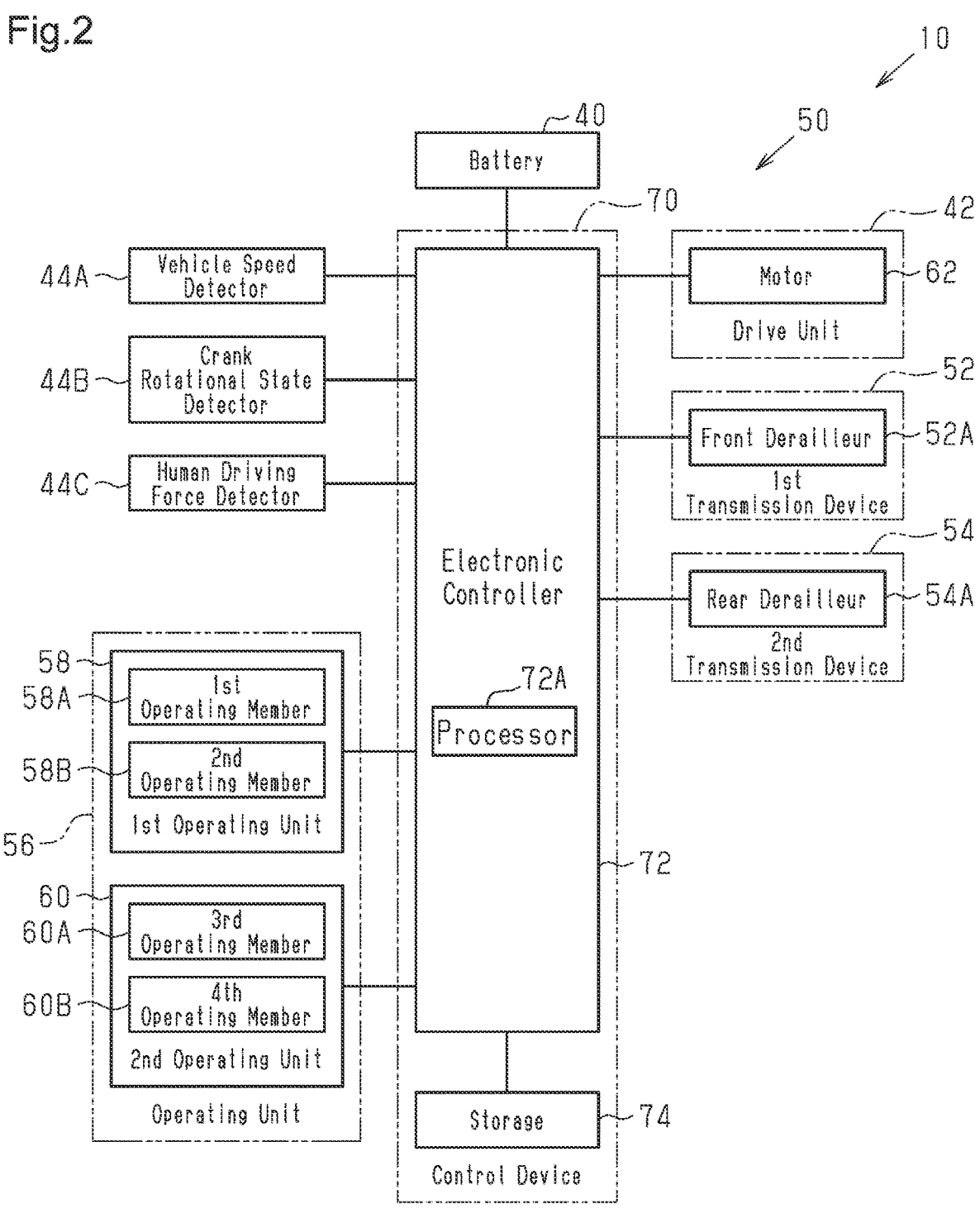
FIG. 2 is a block diagram showing the electrical configuration of the human-powered vehicle shown in FIG. 1 including the control device and the transmission system.

Referring initially to FIGS. 1 and 2, a human-powered vehicle 10 is illustrated in FIG. 1 that is provided with a transmission system 50 and a human-powered vehicle control device 70 of FIG. 2 in accordance with the illustrated embodiments. The human-powered vehicle control device 70 will hereinafter referred to simply as the control device 60. A human-powered vehicle is a vehicle that includes at least one wheel and is driven by at least a human driving force. The human-powered vehicle includes, for example, various types of bicycles such as a mountain bike, a road bike, a city bike, a cargo bike, a handcycle, and a recumbent bike. The number of wheels of the human-powered vehicle is not limited. The human-powered vehicle includes, for example, a monocycle and vehicles having two or more wheels. The human-powered vehicle is not limited to a vehicle driven by only a human driving force. The human-powered vehicle includes an e-bike that uses not only a human driving force but also a drive force of an electric motor for propulsion. An e-bike includes an electric assist bicycle that uses an electric motor to assist in propulsion. In the description hereafter, the human-powered vehicle 10 refers to an electric assist bicycle.

In the present specification, the frame of reference for the terms indicating directions such as "front", "rear", "forward", "rearward", "left", "right", "sideward", "upward", and "downward", as well as other analogous terms indicating directions, will be based on the view of a rider who is facing the handlebar from a reference position (e.g., on saddle or seat) of the human-powered vehicle 10.

As seen in FIG. 1, the human-powered vehicle 10 includes, for example, at least one wheel 12 and a vehicle body 14. The at least one wheel 12 includes, for example, a front wheel 12F and a rear wheel 12R. The vehicle body 14 includes, for example, a frame 16. A saddle, for example, is attached to the frame 16.

The human-powered vehicle 10 further includes a crank 18 that receives, for example, a human driving force. The crank 18 includes, for example, a crank axle 20, which is rotatable relative to the frame 16, and crank arms 22. The crank arms 22 include, for example, a first crank arm 22A and a second crank arm 22B. The first crank arm 22A and the second crank arm 22B are, for example, provided on the two axial ends of the crank axle 20.

Pedals 24, for example, are coupled to the crank arms 22. The pedals 24 include, for example, a first pedal 24A and a second pedal 24B. For example, the first pedal 24A is coupled to the first crank arm 22A. For example, the second pedal 24B is coupled to the second crank arm 22B. A front fork 26, for example, is connected to the frame 16. The front wheel 12F is coupled to, for example, the front fork 26. A handlebar 28 is coupled to, for example, the front fork 26 by a stem 30. The rear wheel 12R is, for example, supported by the frame 16.

The crank 18 is linked to at least one of the front wheel 12F and the rear wheel 12R by, for example, a drive mechanism 32. In the present embodiment, the crank 18 is linked to the rear wheel 12R by a drive mechanism 32. For example, rotation of the crank axle 20 drives the rear wheel 12R. The drive mechanism 32 includes, for example, at least one first rotational body 34 coupled to the crank axle 20. The at least one first rotational body 34 includes, for example, a front sprocket 34A. The at least one first rotational body 34 can include a pulley or a bevel gear. The crank axle 20 can be coupled to the front sprocket 34A by a one-way clutch.

The drive mechanism 32 includes, for example, at least one second rotational body 36 and a linking body 38. The linking body 38 is, for example, configured to transmit the rotational force of the at least one first rotational body 34 to the at least one second rotational body 36. The linking body 38 includes, for example, a chain. The linking body 38 can include a belt or a shaft. The at least one second rotational body 36 includes, for example, a rear sprocket 36A. The at least one second rotational body 36 can include a pulley or a bevel gear. The chain is wound around, for example, the front sprocket 34A and the rear sprocket 36A. The at least one second rotational body 36 is coupled to, for example, the rear wheel 12R. The rear wheel 12R is configured to be rotated by, for example, rotation of the at least one second rotational body 36. In the present embodiment, the at least one first rotational body 34 includes a plurality of first rotational bodies 34, and the at least one second rotational body 36 includes a plurality of second rotational bodies 36.

The human-powered vehicle 10 further includes, for example, a battery 40. The battery 40 includes one or more battery elements. The battery elements include rechargeable batteries. The battery 40 is configured to supply electric power to, for example, the control device 70. The battery 40 is connected to the control device 70 in a manner allowing for wired communication or wireless communication. The battery 40 is connected by, for example, power line communication (PLC), Controller Area Network (CAN), or Universal Asynchronous Receiver-Transmitter (UART) to the control device 70 in a manner allowing for communication.

The transmission system 50 for a human-powered vehicle includes a first transmission device 52, a second transmission device 54, and the control device 70. The first transmission device 52 and the second transmission device 54 are each configured to, for example, shift the transmission ratio. The first transmission device 52 and the second transmission device 54 are, for example, each configured to perform a shifting action for shifting the transmission ratio. The first transmission device 52 is a derailleur or an internal geared hub. The second transmission device 54 is a derailleur or an internal geared hub. For example, one of the first transmission device 52 and the second transmission device 54 is a front transmission, and the other one of the first transmission device 52 and the second transmission device 54 is a rear transmission.

The front transmission is provided, for example, in the vicinity of the crank axle 20. The front transmission is, for example, a front derailleur 52A or a front internal geared hub. The front internal geared hub can include a continuously variable transmission (CVT).

Figure 8:
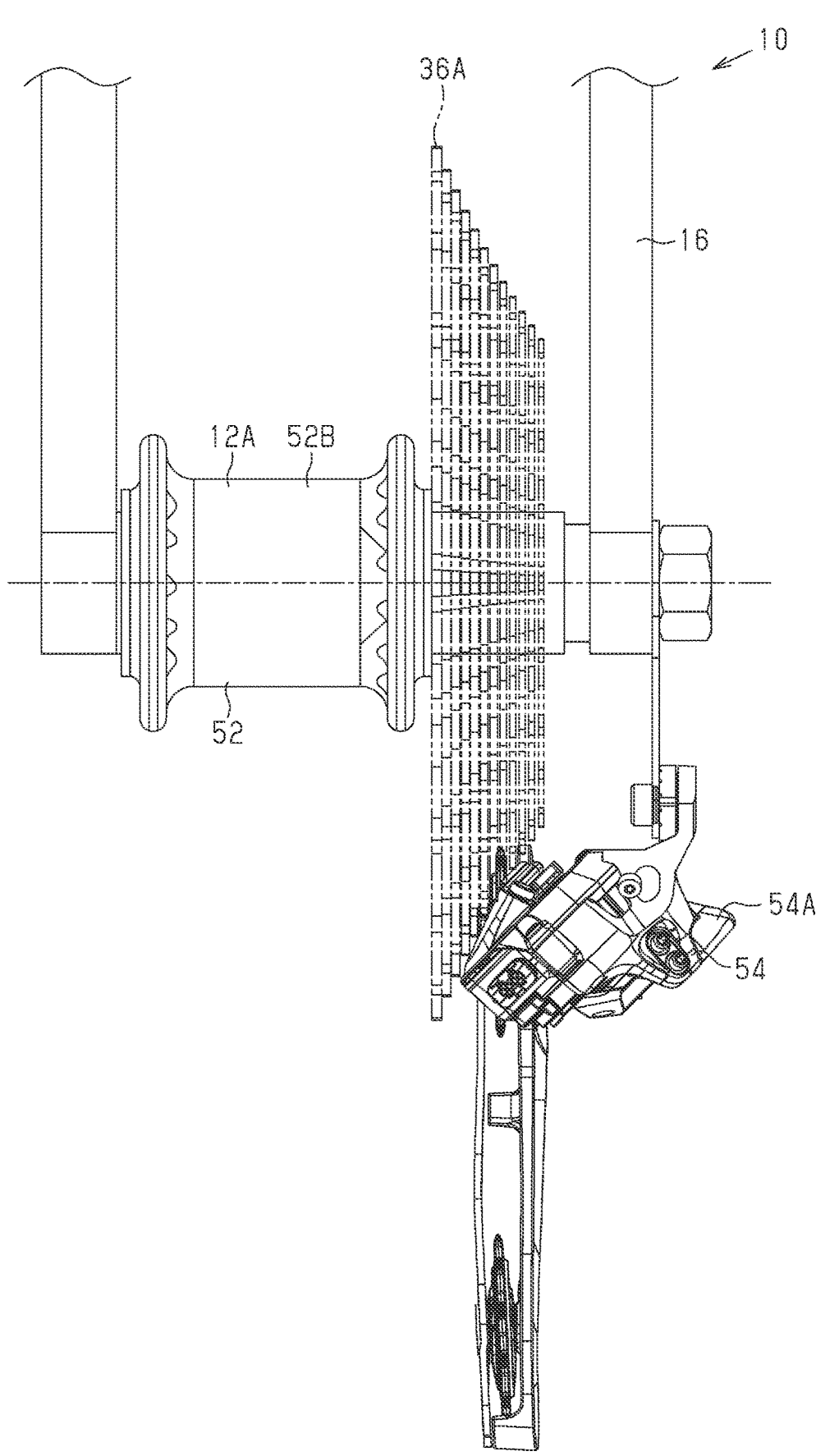
FIG. 8 is a rear elevational view showing a rear wheel axle and its surrounding in a human-powered vehicle including a control device and a transmission system in accordance with a third embodiment.

The rear transmission is provided, for example, in a human driving force transmission path at a portion that is closer to a drive wheel than the front transmission. The rear transmission is provided, for example, in the vicinity of the drive wheel. In the present embodiment, the drive wheel is the rear wheel 12R. The rear transmission is, for example, a rear derailleur 54A or a rear internal geared hub 52B. The rear internal geared hub 52B is provided in, for example, a hub 12A of the rear wheel 12R. The rear internal geared hub 52B can include a CVT. FIG. 8 shows the hub 12A of the rear wheel 12R.

For example, one of the first transmission device 52 and the second transmission device 54 is a front transmission, and the other one of the first transmission device 52 and the second transmission device 54 is a rear transmission. In the present embodiment, the first transmission device 52 is the front transmission, and the second transmission device 54 is the rear transmission. The first transmission device 52 is, for example, the front derailleur 52A or the rear internal geared hub 52B provided in the hub 12A of the rear wheel 12R. The second transmission device 54 is, for example, the rear derailleur 54A.

In a case where both of the first transmission device 52 and the second transmission device 54 are derailleurs, the transmission ratio is defined as the quotient obtained by dividing the number of teeth of the first rotational body 34 engaged with the linking body 38 by the number of teeth of the second rotational body 36 engaged with the linking body 38. In a case where the first rotational body 34 includes the front sprocket 34A and the second rotational body 36 includes the rear sprocket 36A, the transmission ratio is defined as, for example, the quotient obtained by dividing the number of teeth of the front sprocket 34A engaged with the linking body 38 by the number of teeth of the rear sprocket 36A engaged with the linking body 38. The transmission ratio can be defined as the quotient obtained by dividing the rotational speed of the drive wheel by the rotational speed of the crank axle 20. The rotational speed of the drive wheel and the rotational speed of the crank axle 20 can each be the number of rotations per unit time.

At least one of the first transmission device 52 and the second transmission device 54 can, for example, shift the transmission ratio by changing speed stages. The first transmission device 52 and the second transmission device 54 are, for example, configured to move the linking body 38 in order to change the speed stage, or transmission stage. For example, a different transmission ratio is set for each of the speed stages. For example, the transmission ratio increases as the speed stage increases, and the transmission ratio decreases as the speed stage decreases.

In a case where the transmission system 50 includes the front derailleur 52A, the first rotational bodies 34 include, for example, front sprockets 34A. The front sprockets 34A each have a different number of teeth. The front sprockets 34A are, for example, two in number. The front sprockets 34A can be three in number. The front sprockets 34A are, for example, arranged next to one another in order of number of teeth and coupled to the crank axle 20 so that the front sprockets 34A having less teeth are closer to the vehicle body 14.

The front derailleur 52A is configured to shift the transmission ratio in stages by, for example, moving the linking body 38 from one front sprocket 34A to another front sprocket 34A. The front derailleur 52A is, for example, configured to be able to perform a shifting action that moves the linking body 38 from one front sprocket 34A to another front sprocket 34A. The front derailleur 52A is, for example, configured to be actuated by an electric actuator. The electric actuator includes, for example, an electric motor. The front derailleur 52A is, for example, wire-connected or wirelessly connected to the controller 72. The front derailleur 52A includes, for example, a speed stage sensor that detects the speed stage.

The front derailleur 52A performs shifting actions including, for example, a first down-shifting action and a first up-shifting action. The front derailleur 52A is, for example, configured to be able to perform a first down-shifting action that decreases the transmission ratio by moving the linking body 38 from one front sprocket 34A to another front sprocket 34A. The front derailleur 52A is, for example, configured to be able to perform a first up-shifting action that increases the transmission ratio by moving the linking body 38 from one front sprocket 34A to another front sprocket 34A.

In a case where the transmission system 50 includes the rear derailleur 54A, the at least one second rotational body 36 includes rear sprockets 36A. The rear sprockets 36A each have a different number of teeth. The rear sprockets 36A are, for example, eleven in number. The rear sprockets 36A are, for example, arranged next to one another in order of number of teeth and coupled to the axle of the rear wheel 12R so that the rear sprockets 36A having more teeth are closer to the vehicle body 14. Further, the rear sprockets 36A are rotated integrally with the rear wheel 12R.

The rear derailleur 54A is configured to shift the transmission ratio in stages by, for example, moving the linking body 38 from one rear sprocket 36A to another rear sprocket 36A. The rear derailleur 54A is, for example, configured to be able to perform a shifting action that moves the linking body 38 from one rear sprocket 36A to another rear sprocket 36A. The rear derailleur 54A is, for example, configured to be actuated by an electric actuator. The electric actuator includes, for example, an electric motor. The rear derailleur 54A is, for example, wire-connected or wirelessly connected to the controller 72. The rear derailleur 54A includes, for example, a speed stage sensor that detects the speed stage.

The rear derailleur 54A performs shifting actions including, for example, a second down-shifting action and a second up-shifting action. The rear derailleur 54A is, for example, configured to be able to perform a second down-shifting action that decreases the transmission ratio by moving the linking body 38 from one rear sprocket 36A to another rear sprocket 36A. The rear derailleur 54A is, for example, configured to be able to perform a second up-shifting action that increases the transmission ratio by moving the linking body 38 from one rear sprocket 36A to another rear sprocket 36A.

In a case where the front sprockets 34A are two in number, the front derailleur 52A sets, for example, two speed stages. For example, the front derailleur 52A sets the lowest speed stage so that the linking body 38 engages the one of the front sprockets 34A with the least teeth. For example, the front derailleur 52A sets the highest speed stage so that the linking body 38 engages the one of the front sprockets 34A with the most teeth.

In a case where the rear sprockets 36A are eleven in number, the rear derailleur 54A sets, for example, eleven speed stages. For example, the rear derailleur 54A sets the lowest speed stage so that the linking body 38 engages the one of the rear sprockets 36A with the most teeth. For example, the rear derailleur 54A sets the highest speed stage so that the linking body 38 engages the one of the rear sprockets 36A with the least teeth.

A transmission stage is set, for example, in accordance with a combination of the speed stage set by the first transmission device 52 and the speed stage set by the second transmission device 54. For example, a combination of the one of the front sprockets 34A with the least teeth and the one of the rear sprockets 36A with the most teeth corresponds to the lowest transmission stage that can be set by the first transmission device 52 and the second transmission device 54. For example, a combination of the one of the front sprockets 34A with the most teeth and the one of the rear sprockets 36A with the least teeth corresponds to the highest transmission stage that can be set by the first transmission device 52 and the second transmission device 54.

As seen in FIG. 2, the human-powered vehicle 10 further includes an electronic controller 72. In particular, the control device 70 of the human-powered vehicle 10 includes the electronic controller 72. The electronic controller 72 will hereinafter be referred to simply as the controller 72. Also, as seen in FIG. 2, the human-powered vehicle 10 further includes one or more detectors for detecting one or more operating conditions of the human-powered vehicle 10. The term "detector" as used herein refers to a hardware device or instrument designed to detect the presence or absence of a particular event, object, substance, or a change in its environment, and to emit a signal in response. The term "detector" as used herein do not include a human being. The controller 72 is configured to receive input signals from various detectors as explained below. Also, the controller 72 is configured to receive input signals from input devices such as operating units as explained below.

The human-powered vehicle 10 includes, for example, an operating unit 56 operable by a user. When operated by, for example, the user, the operating unit 56 has at least one of the first transmission device 52 and the second transmission device 54 perform a shifting action to shift the transmission ratio. When operated by, for example, the user, the operating unit 56 is configured to output a signal to the controller 72 so that at least one of the first transmission device 52 and the second transmission device 54 performs a shifting action. The operating unit 56 includes, for example, a first operating unit 58 and a second operating unit 60.

The first operating unit 58 is attached to, for example, one of the left side and right side of the handlebar 28. The first operating unit 58 can also be referred to as a first user operating device of a first shifter. The second operating unit 60 is attached to, for example, the other one of the left side and right side of the handlebar 28. The second operating unit 60 can also be referred to as a second user operating device of a second shifter. In the present embodiment, the first operating unit 58 is attached to the left side of the handlebar 28, and the second operating unit 60 is attached to the right side of the handlebar 28.

The first operating unit 58 is electrically connected to the controller 72 by a wire or in a wireless manner. The first operating unit 58 is, for example, configured to output a signal to the controller 72 in order to have one of the first transmission device 52 and the second transmission device 54 perform a shifting action. In the present embodiment, the first operating unit 58 is configured to send a signal to the controller 72 in order to have the first transmission device 52 perform a shifting action. The signal that has the first transmission device 52 perform a shifting action includes a first shifting signal and a second shifting signal. The first operating unit 58 includes, for example, a first operating member 58A that sends the first shifting signal to the controller 72 and a second operating member 58B that sends the second shifting signal to the controller 72.

The first operating member 58A and the second operating member 58B includes, for example, at least one of a lever, a switch, and a dial. The first operating member 58A can be referred to as a first user input member, and the second operating member 58B can be referred to as a second user input member. For example, if the first operating member 58A is operated by the user, the first shifting signal is sent to the controller 72. For example, if the second operating member 58B is operated by the user, the second shifting signal is sent to the controller 72. The second shifting signal, for example, differs from the first shifting signal. The first shifting signal, for example, has the first transmission device 52 perform a first down-shifting action. The second shifting signal, for example, has the first transmission device 52 perform a first up-shifting action.

The second operating unit 60 is, for example, electrically connected to the controller 72 by a wire or in a wireless manner. The second operating unit 60 is, for example, configured to output a signal to the controller 72 in order to have one of the first transmission device 52 and the second transmission device 54 perform a shifting action. In the present embodiment, the second operating unit 60 is configured to send a signal to the controller 72 in order to have the second transmission device 54 perform a shifting action. The signal that has the second transmission device 54 perform a shifting action includes a third shifting signal and a fourth shifting signal. The second operating unit 60 includes, for example, a third operating member 60A that sends the third shifting signal to the controller 72 and a fourth operating member 60B that sends the fourth shifting signal to the controller 72.

The third operating member 60A and the fourth operating member 60B include, for example, at least one of a lever, a switch, and a dial. The third operating member 60A can be referred to as a third user input member, and the fourth operating member 60B can be referred to as a fourth user input member. For example, if the third operating member 60A is operated by the user, the third shifting signal is sent to the controller 72. For example, if the fourth operating member 60B is operated by the user, the fourth shifting signal is sent to the controller 72. The third shifting signal, for example, differs from the first and second shifting signals. The fourth shifting signal, for example, differs from the first, second, and third shifting signals. The third shifting signal, for example, has the second transmission device 54 perform a second down-shifting action. The fourth shifting signal, for example, has the second transmission device 54 perform a second up-shifting action.

As mentioned above, the control device 70 includes the controller 72. The controller 72 is formed of one or more semiconductor chips that are mounted on a circuit board. Thus, the terms "electronic controller" and "controller" as used herein refers to hardware that executes a software program, and does not include a human being. The controller 72 includes, for example, a one or more processor 72A that executes predetermined control programs. Each of the processors 72A of the controller 72 includes, for example, a central processing unit (CPU) or a micro-processing unit (MPU). The controller 72 is provided on, for example, the vehicle body 14. The controller 72 is provided in, for example, a lower part of the seatpost of the human-powered vehicle 10.

The processors 72A of the controller 72 can be arranged at separate locations. Part of the processing of the control device 70 can be provided on the human-powered vehicle 10, and another part of the processing of the control device 70 can be provided in a server connected to the internet. In a case where the processors are arranged at separate locations, the processors can communicate with one another through a wireless communication device. Thus, the controller 72 can include one or more microcomputers.

The control device 70 further includes, for example, storage 74. The storage 74 is any computer storage device or any non-transitory computer-readable medium with the sole exception of a transitory, propagating signal. The storage 74 is, for example, connected to the controller 72 in a manner allowing for wired communication or wireless communication. The storage 74 stores, for example, control programs and information used for control processes. The storage 74 includes, for example, a nonvolatile memory and a volatile memory. The nonvolatile memory includes, for example, at least one of a read-only memory (ROM), an erasable programmable read-only memory (EPROM), an electrically erasable programmable read-only memory (EEPROM), and a flash memory. The volatile memory includes, for example, a random access memory (RAM).

The controller 72 is, for example, configured to control the first transmission device 52 and the second transmission device 54. The controller 72 is, for example, configured to control at least one of the first transmission device 52 and the second transmission device 54 in accordance with a shifting condition for shifting the transmission ratio. The shifting condition is satisfied, for example, in a case where the controller 72 receives a signal from the operating unit 56 for having one of the first transmission device 52 and the second transmission device 54 perform a shifting action. The controller 72 is, for example, configured to have the first transmission device 52 perform a shifting action in a case where a signal for having the first transmission device 52 perform a shifting action is received from the operating unit 56. The controller 72 is, for example, configured to have the second transmission device 54 perform a shifting action in a case where a signal for having the second transmission device 54 perform a shifting action is received from the operating unit 56.

In a case where the controller 72 receives the first shifting signal, the controller 72 is, for example, configured to control the first transmission device 52 so that the first transmission device 52 performs a first down-shifting action. In a case where the controller 72 receives the second shifting signal, the controller 72 is, for example, configured to control the first transmission device 52 so that the first transmission device 52 performs a first up-shifting action. In a case where the controller 72 receives the third shifting signal, the controller 72 is, for example, configured to control the second transmission device 54 so that the second transmission device 54 performs a second down-shifting action. In a case where the controller 72 receives the fourth shifting signal, the controller 72 is, for example, configured to control the second transmission device 54 so that the second transmission device 54 performs a second up-shifting action.

The shifting condition can be related with automatic shifting. The controller 72 is, for example, configured to control at least one of the first transmission device 52 and the second transmission device 54 in a case where the shifting condition related to automatic shifting is satisfied. The shifting condition related to automatic shifting is, for example, specified based on a reference value and threshold values related to the human-powered vehicle 10. The reference value and the threshold value are, for example, specified in accordance with at least one of the traveling state of the human-powered vehicle 10 and the traveling environment of the human-powered vehicle 10. The reference value is, for example, a parameter detected by a detector provided on the human-powered vehicle 10. The threshold values are, for example, stored in the storage 74. The traveling state of the human-powered vehicle 10 includes, for example, the vehicle speed, the rotational speed of the crank axle 20, the human driving force, and the inclination angle of the human-powered vehicle 10. The traveling environment of the human-powered vehicle 10 includes at least one of the road surface gradient and the road surface resistance.

The threshold values include, for example, an upper limit threshold value and a lower limit threshold value. The controller 72 is, for example, configured to control at least one of the first transmission device 52 and the second transmission device 54 in order to shift the transmission ratio so that the reference value is included between the upper threshold value and the lower threshold value. The controller 72 is, for example, configured to control at least one of the first transmission device 52 and the second transmission device 54 in order to increase the transmission ratio in a case where the reference value becomes greater than the upper threshold value. The controller 72 is, for example, configured to control at least one of the first transmission device 52 and the second transmission device 54 in order to decrease the transmission ratio in a case where the reference value becomes less than the lower threshold value. The controller 72 can be, for example, configured to control at least one of the first transmission device 52 and the second transmission device 54 in order to decrease the transmission ratio in a case where the reference value becomes less than the upper threshold value. The controller 72 can be, for example, configured to control at least one of the first transmission device 52 and the second transmission device 54 in order to increase the transmission ratio in a case where the reference value becomes less than the lower threshold value.

The human-powered vehicle 10 includes, for example, a motor 62 that assists in propulsion of the human-powered vehicle 10. The transmission system 50 for a human-powered vehicle in accordance with the present embodiment includes the first transmission device 52, the second transmission device 54, the motor 62 that assists in propulsion of the human-powered vehicle 10, and the controller 72.

The motor 62 is, for example, configured to assist in propulsion of the human-powered vehicle 10 in accordance with the human driving force. The motor 62 includes, for example, one or more electric motors. The electric motor included in the motor 62 is, for example, a brushless motor. The motor 62 is, for example, configured to transmit a rotational force from at least one member included in a power transmission path of a human driving force extending from the first pedal 24A and the second pedal 24B to at least one of the second rotational bodies 36. The motor 62 includes, for example, an output shaft. For example, the output shaft transmits a rotational force of the motor 62 from at least one member included in the power transmission path of a human driving force extending from the first pedal 24A and the second pedal 24B to at least one of the second rotational bodies 36.

The motor 62 is, for example, configured to drive the linking body 38 through at least one of the first rotational bodies 34. The motor 62 is, for example, provided on the frame 16 and configured to transmit a rotational force to at least one of the first rotational bodies 34. The motor 62 can be configured in any manner as long as it can drive the linking body 38. The motor 62 can be configured to drive the linking body 38 through the second rotational body 36. In a case where the motor 62 drives the linking body 38 through the second rotational body 36, the motor 62 can be provided on a hub of the human-powered vehicle 10 and be configured to transmit a rotational force to the second rotational body 36.

The human-powered vehicle 10 further includes, for example, a drive unit 42. The drive unit 42 includes, for example, the motor 62 and a housing. The motor 62 is, for example, provided in the housing. The housing is, for example, attached to the frame 16. The housing, for example, rotatably supports the crank axle 20.

The control device 70 can further include a drive circuit of the motor 62. The controller 72 and the drive circuit are, for example, provided in the same housing. In a case where the controller 72 is provided in the drive unit 42, the controller 72 and the drive circuit are provided in the housing of the drive unit 42. The controller 72 and the drive circuit can be provided on the same circuit board. The drive circuit is, for example, connected to the controller 72 in a manner allowing for wired or wireless communication. The drive circuit drives the motor 62, for example, in response to a control signal from the controller 72.

The drive circuit is, for example, electrically connected to the motor 62. The drive circuit controls, for example, the supply of electric power from the battery 40 to the motor 62. The drive circuit includes, for example, an inverter circuit. The inverter circuit includes, for example, a plurality of transistors. The inverter circuit includes, for example, a configuration of parallel-connected inverters, each formed by two series-connected transistors. The inverter circuit can include an electric current sensor that detects the electric current flowing through the inverter circuit. The current sensor is, for example, connected to the controller 72 in a manner allowing for wired or wireless communication.

The human-powered vehicle 10 further includes, for example, a vehicle speed detector 44A. The vehicle speed detector 44A is, for example, connected to the controller 72 in a manner allowing for wired or wireless communication. The vehicle speed detector 44A is, for example, configured to detect information related to the vehicle speed of the human-powered vehicle 10. The vehicle speed detector 44A is, for example, configured to detect the rotational speed of a wheel 12. The vehicle speed detector 44A is configured to detect, for example, a magnet provided on at least one of the front wheel 12F and the rear wheel 12R.

The vehicle speed detector 44A is configured to output, for example, a predetermined number of detection signals during a single rotation of the wheel 12. The predetermined number of detection signals is, for example, one. The vehicle speed detector 44A outputs, for example, a signal corresponding to the rotational speed of the wheel 12. The controller 72 calculates the speed of the human-powered vehicle 10 based on a signal corresponding to the rotational speed of the wheel 12 and information related to the circumferential length of the wheel 12. The storage 74 stores, for example, information related to the circumferential length of the wheel 12.

The human-powered vehicle 10 further includes, for example, a crank rotational state detector 44B. The crank rotational state detector 44B is, for example, connected to the controller 72 in a manner allowing for wired or wireless communication. The crank rotational state detector 44B, for example, detects the rotational amount of the crank axle 20 and/or at least one of the first rotational bodies 34.

The crank rotational state detector 44B is, for example, configured to detect information corresponding to the rotational speed of the crank axle 20 and/or the rotational speed of at least one of the first rotational bodies 34. Information corresponding to the rotational speed of the crank axle 20 includes, for example, angular acceleration of the crank axle 20. Information corresponding to the rotational speed of at least one of the first rotational bodies 34 includes, for example, angular acceleration of the at least one of the first rotational bodies 34.

The crank rotational state detector 44B is, for example, configured to output a signal corresponding to the rotational speed of the crank axle 20 and/or the rotational speed of at least one of the first rotational bodies 34. The crank rotational state detector 44B is, for example, configured to output a detection signal corresponding to the rotated angle of the crank axle 20 and/or at least one of the first rotational bodies 34 during a single rotation of the crank axle 20 and/or at least one of the first rotational bodies 34.

The crank rotational state detector 44B includes, for example, a magnetic sensor configured to output a signal corresponding to the strength of a magnetic field. The crank rotational state detector 44B includes, for example, a ring-shaped magnet in which magnetic poles are arranged in the circumferential direction. The ring-shaped magnet is provided, for example, on the crank axle 20, on at least one of the first rotational bodies 34, or in a power transmission path extending from the crank axle 20 to at least one of the first rotational bodies 34. The ring-shaped magnet includes, for example, a single S-pole and a single N-pole. The single S-pole and the single N-pole each extend 180 degrees continuously about the rotational center axis of the crank axle 20. Instead of a magnetic sensor, the crank rotational state detector 44B can include an optical sensor, an acceleration sensor, a gyro sensor, or a torque sensor The crank rotational state detector 44B is provided on, for example, the frame 16. In a case where the crank rotational state detector 44B is provided on the frame 16, the crank rotational state detector 44B can include a vehicle speed sensor. In a case where the crank rotational state detector 44B includes a vehicle speed sensor, the controller 72 is configured to detect the rotational speed of the crank axle 20 from the transmission ratio and the vehicle speed detected by the vehicle speed sensor. The crank rotational state detector 44B can be provided in the drive unit 42.

The crank rotational state detector 44B can be configured to detect the rotational amount of at least one of the second rotational bodies 36. The crank rotational state detector 44B can be configured to detect information corresponding to the rotational speed of at least one of the second rotational bodies 36. Information corresponding to the rotational speed of at least one of the second rotational bodies 36 includes, for example, angular acceleration of the at least one of the second rotational bodies 36. The crank rotational state detector 44B can be configured to output a signal corresponding to the rotational speed of at least one of the second rotational bodies 36.

The human-powered vehicle 10 further includes, for example, a human driving force detector 44C. The human driving force detector 44C is, for example, connected to the controller 72 in a manner allowing for wired or wireless communication. The human driving force detector 44C is configured to output, for example, a signal corresponding to the torque applied to the crank axle 20 by a human driving force. The signal corresponding to the torque applied to the crank axle 20 by the human driving force includes information related to the human driving force input to the human-powered vehicle 10.

The human driving force detector 44C is provided, for example, on a member that is included in a transmission path of a human driving force or on a member that is located in the vicinity of a member included in the transmission path of the human driving force. The member included in the transmission path of the human driving force includes, for example, the crank axle 20 and a member that transmits a human driving force between the crank axle 20 and at least one of the first rotational bodies 34. The human driving force detector 44C is, for example, provided in a power transmission portion configured to transmit the human driving force from the crank axle 20 to an output portion. The power transmission portion is provided on, for example, the outer circumferential portion of the crank axle 20.

The human driving force detector 44C includes a strain sensor, a magnetostrictive sensor, a pressure sensor, or the like. The strain sensor includes a strain gauge. The human driving force detector 44C can be configured in any manner as long as information related to the human driving force can be obtained.

The human driving force detector 44C is provided on, for example, at least one of the first crank arm 22A, the second crank arm 22B, the first pedal 24A, and the second pedal 24B. In a case where the human driving force detector 44C is provided on at least one of the first pedal 24A and the second pedal 24B, the human driving force detector 44C can include a sensor that detects the pressure applied to at least one of the first pedal 24A and the second pedal 24B. The human driving force detector 44C can be provided on a chain included in the linking body 38. In a case where the human driving force detector 44C is provided on the chain, the human driving force detector 44C can include a sensor that detects the tension on the chain.

The controller 72 is configured to control the motor 62. The controller 72 is, for example, configured to control the motor 62 in accordance with the state of the human-powered vehicle 10. The controller 72 is, for example, configured to control the motor 62 to change the output of the motor 62 in accordance with the human driving force input to the human-powered vehicle 10. The controller 72 is configured to control the motor 62 to change the propulsion force in accordance with the human driving force input to the human-powered vehicle 10.

The controller 72 is, for example, configured to control the motor 62 in accordance with the human driving force detected by the human driving force detector 44C. The controller 72 can be configured to control the motor 62 in accordance with at least one of the rotational speed of the crank axle 20 and/or the rotational speed of at least one of the first rotational bodies 34 detected by the crank rotational state detector 44B. The controller 72 can be configured to control the motor 62 in accordance with the speed of the human-powered vehicle 10 detected by the vehicle speed detector 44A.

The controller 72 is, for example, configured to control the motor 62 to stop the motor 62 in a case where the vehicle speed is greater than or equal to a predetermined vehicle speed. The controller 72 is, for example, configured to drive the motor 62 so as to apply propulsion force to the human-powered vehicle 10 in accordance with at least one of the human driving force and the rotational speed of the crank axle 20 in a case where the speed of the human-powered vehicle 10 is less than a predetermined speed. The predetermined vehicle speed is, for example, governed by regulations specific to each country. The predetermined vehicle speed is, for example, 24 km/h, 25 km/h, 30 km/h, 32 km/h, or 45 km/h.

The controller 72 is, for example, configured to control the motor 62 so that an assist level of the motor 62 becomes a predetermined assist level. The assist level includes, for example, at least one of an upper limit value of the output of the motor 62, an assist ratio that is a ratio of the output of the motor 62 to the human driving force input to the human-powered vehicle 10, and a restriction level that restricts changes in the output of the motor 62 in a case where the output of the motor 62 decreases.

The controller 72 is, for example, configured to control the motor 62 so that the assist ratio becomes a predetermined ratio. The predetermined ratio does not have to be constant and can be varied in accordance with at least one of the human driving force, the rotational speed of the crank axle 20, the rotational speed of at least one of the first rotational bodies 34, and the vehicle speed. The predetermined ratio does not have to be set constant and can be varied in accordance with the vehicle speed and at least one of the human driving force, the rotational speed of the crank axle 20, and the rotational speed of at least one of the first rotational bodies 34. The controller 72 is configured to be able to select, for example, an assist mode and a non-assist mode.

The human driving force corresponds to, for example, the propulsion force applied to the human-powered vehicle 10 by the user rotating the crank axle 20. The human driving force corresponds to, for example, the driving force input to at least one of the first rotational bodies 34 by the user rotating the crank axle 20. The human driving force is, for example, expressed as at least one of torque and power. In a case where the human driving force is expressed as torque, the human driving force is referred to as, for example, human torque. The power of the human driving force is, for example, the product of the torque applied to the crank axle 20 and the rotational speed of the crank axle 20.

The controller 72 is, for example, configured to control the motor 62 so that the assist force is less than or equal to the maximum assist force. The assist force includes, for example, the driving force input to at least one of the first rotational bodies 34 in accordance with the output of the motor 62. The assist force corresponds to, for example, the propulsion force of the human-powered vehicle 10 produced through rotation of the motor 62. In a case where the drive unit 42 includes a speed reducer, the assist force corresponds to, for example, the output of the speed reducer.

The assist force is, for example, expressed as at least one of torque and power. In a case where the assist force is expressed as torque, the assist force is described as, for example, assist torque. In a case where the assist force is expressed as power, the assist force is referred to as, for example, assist power. The assist power is, for example, the product of the output torque of the speed reducer and the rotational speed of an output shaft of the speed reducer. The ratio of the assist force to the human driving force can be a ratio of the assist torque to the human torque or a ratio of the assist power to the human force power.

The controller 72 is, for example, configured to control the motor 62 so that the assist torque is less than or equal to the maximum assist torque. The maximum assist torque is, for example, a value in a range from 20 Nm or greater to 200 Nm or less. The maximum assist torque is determined by, for example, at least one of an output characteristic and a control mode of the motor 62. The controller 72 can be configured to control the motor 62 so that the assist power is less than or equal to the maximum assist power.

The controller 72 is, for example, configured to control the motor 62 so that the response speed of the assist torque with respect to the human driving force is a predetermined value. The controller 72 is, for example, configured to control the motor 62 so that the response speed in a case where the human driving force decreases is less than the response speed in a case where the human driving force increases. In a case where the human driving force decreases, for example, the controller 72 decreases the response speed through a filtering process. The filter includes, for example, a time constant.

The controller 72 is configured to be able to execute a first operation for changing an output of the motor 62 in a case where one of the first transmission device 52 and the second transmission device 54 performs a shifting action for shifting a transmission ratio of the human-powered vehicle 10. The controller 72 can be configured to change at least one of the output of the motor 62, the upper limit value of the output of the motor 62, the assist ratio, and the response speed of the output of the motor 62 with respect to a change in the human driving force in a case where at least one of the first transmission device 52 and the second transmission device 54 performs a shifting action during the first operation.

The controller 72 is, for example, configured to control the motor 62 in order to decrease the output of the motor 62 in a case where at least one of the first transmission device 52 and the second transmission device 54 performs a shifting action during the first operation. The controller 72 is, for example, configured to control the motor 62 in order to decrease the output of the motor 62 in a case where at least one of the first transmission device 52 and the second transmission device 54 performs a shifting action in accordance with a shifting condition during the first operation.

The controller 72 is, for example, configured to control the motor 62 so that the output of the motor 62 becomes less than or equal to a predetermined torque in a case where the first transmission device 52 performs a shifting action during the first operation. The predetermined torque is, for example, 0 Nm.

The controller 72 is, for example, configured to control the motor 62 in order to decrease the output of the motor 62 in a case where the first transmission device 52 performs a first down-shifting action during the first operation. The controller 72 is, for example, configured to control the motor 62 in order to decrease the output of the motor 62 in a case where the first transmission device 52 performs a first up-shifting action during the first operation. The controller 72 is, for example, configured to control the motor 62 in order to decrease the output of the motor 62 in a case where the second transmission device 54 performs a second down-shifting action during the first operation. The controller 72 is, for example, configured to control the motor 62 in order to decrease the output of the motor 62 in a case where the second transmission device 54 performs a second up-shifting action during the first operation.

In a case where the first transmission device 52 performs a shifting action, the controller 72 is, for example, configured to control the first transmission device 52 so that the first transmission device 52 performs a shifting action in accordance with at least one of the human driving force, the rotational angle of the crank axle 20, the rotational speed of the first rotational body 34, and a first shifting facilitation region provided in the first rotational body 34. In a case where the first transmission device 52 performs a shifting action during the first operation, the controller 72 is, for example, configured to control the motor 62 so that the output torque of the motor 62 becomes less than or equal to the predetermined torque during a period from a time point at which the first transmission device 52 starts the shifting action to a time point at which the first transmission device 52 ends the shifting action.

In a case where the second transmission device 54 performs a shifting action, the controller 72 is, for example, configured to control the second transmission device 54 so that the second transmission device 54 performs the shifting action in accordance with at least one of the human driving force, the rotational angle of the crank axle 20, the rotational angle of the second rotational body 36, and a second shifting facilitation region provided in the second rotational body 36. In a case where the second transmission device 54 performs a shifting action during the first operation, the controller 72 is, for example, configured to control the motor 62 so that the upper limit value of the output torque of the motor 62 becomes less than or equal to the predetermined torque during a period from a time point at which the second transmission device 54 starts the shifting action to a time point at which the second transmission device 54 ends the shifting action.

The controller 72 is, for example, configured to restrict shifting actions that are performed successively in a case where the first operation is executed. Successively performed shifting actions are, for example, shifting actions performed by the first transmission device 52 or the second transmission device 54 to shift the speed stage by two or more stages. The controller 72 is, for example, configured to execute the first operation in a case where the operating unit 56 is operated to perform a shifting action with only the first transmission device 52. The controller 72 is, for example, configured to execute the first operation in a case where the operating unit 56 is operated to perform a shifting action with only the second transmission device 54.

The controller 72 is configured to be able to execute a second operation for shifting the transmission ratio through a predetermined shifting sequence involving a combination of the shifting action of the first transmission device 52 and the shifting action of the second transmission device 54. A combination of the shifting action of the first transmission device 52 and the shifting action of the second transmission device 54 includes, for example, a case in which the first transmission device 52 and the second transmission device 54 both perform a shifting action, a case in which only the first transmission device 52 performs a shifting action, and a case in which only the second transmission device 54 performs a shifting action. The predetermined shifting sequence is, for example, a sequence for shifting the speed stage of the first transmission device 52 and the speed stage of the second transmission device 54 following a shifting pattern. In a case where shifting is performed through the predetermined shifting sequence, the order in which the shifting actions of the first transmission device 52 and the second transmission device 54 are performed is determined following the shifting pattern.

The shifting pattern includes, for example, a first shifting pattern. The first shifting pattern is, for example, set so that the positions of the front sprockets 34A, the rear sprockets 36A, and the linking body 38 are appropriate. In a case where at least one of the first transmission device 52 and the second transmission device 54 performs a shifting action following the first shifting pattern, for example, the distance between the front sprocket 34A, around which the chain is wound, and the rear sprocket 36A, around which the chain is wound, in the sideward direction will be within a predetermined range. The first shifting pattern is set so that, for example, the second transmission device 54 performs a shifting action to shift to any one of the shift stages.

The controller 72 is, for example, configured to be able to select a first mode for executing the first operation following the first shifting pattern. For example, in a case where the first mode is selected, if a shifting condition is satisfied, the controller 72 executes the first operation by controlling at least one of the first transmission device 52 and the second transmission device 54 so that the at least one of the first transmission device 52 and the second transmission device 54 performs a shifting action following the first shifting pattern. The controller 72 is configured to be able to execute the first operation by controlling the at least one of the first transmission device 52 and the second transmission device 54 so that the at least one of the first transmission device 52 and the second transmission device 54 performs a shifting action following the first shifting pattern in a case where the user operates the operating unit 56. The first shifting pattern includes, for example, a first down-shifting pattern and a first up-shifting pattern. The storage 74 stores, for example, the first down-shifting pattern and the first up-shifting pattern.

In the first mode, the controller 72 is, for example, configured to execute the first operation following the first down-shifting pattern illustrated by the arrowed dashed lines AX in FIG. 3 and the first up-shifting pattern illustrated by the dot-dashed lines AY in FIG. 3.

The controller 72, for example, controls at least one of the first transmission device 52 and the second transmission device 54 following the first down-shifting pattern and the first up-shifting pattern. The controller 72 is, for example, configured to control at least one of the first transmission device 52 and the second transmission device 54 in order to execute the first operation following the first down-shifting pattern in a case where the third shifting signal is received in the first mode. The controller 72 is, for example, configured to control at least one of the first transmission device 52 and the second transmission device 54 in order to execute the first operation following the first up-shifting pattern in a case where the fourth shifting signal is received in the first mode. The first down-shifting pattern and the first up-shifting pattern include, for example, a first shifting action that moves both of the first transmission device 52 and the second transmission device 54 and a second shifting action that moves only the second transmission device 54.

The controller 72 is, for example, configured not to control the first transmission device 52 in response to a first shifting signal and a second shifting signal that are output from the first operating unit 58 in the first mode. The controller 72 can be configured to be able to control the first transmission device 52 in response to the first shifting signal and the second shifting signal output from the first operating unit 58 in the first mode. The controller 72 is, for example, configured to permit shifting actions that are performed successively in a case where the first operation is executed in the first mode.

The shifting pattern includes, for example, a second shifting pattern. The second shifting pattern is set to, for example, reduce shifting shocks. The second shifting pattern is set to, for example, reduce shifting shocks caused by the shifting action of the first transmission device 52. The second shifting pattern is set so that, for example, the first transmission device 52 performs a shifting action to shift to any one of the shift stages.

The controller 72 is, for example, configured to be able to select a second mode for executing the second operation following the second shifting pattern. The controller 72 is, for example, configured to be able to execute the second operation by controlling the first transmission device 52 and the second transmission device 54 so that the first transmission device 52 and the second transmission device 54 perform a shifting action following the second shifting pattern if the controller 72 receives the first shifting signal or the second shifting signal from the first operating unit 58 in a case where the combination of one of the first rotational bodies 34 and one of the second rotational bodies 36 becomes a predetermined combination. The second shifting pattern is, for example, a shifting pattern for performing a number of shifting actions with the second transmission device 54 in accordance with the shifting action of the first transmission device 52 to obtain the preferred transmission ratio. The second shifting pattern includes, for example, a second down-shifting pattern and a second up-shifting pattern. The storage 74 stores, for example, the second down-shifting pattern and the second up-shifting pattern.

In the second mode, the controller 72 is, for example, configured to execute the second operation in accordance with the second down-shifting pattern illustrated by the arrowed dashed lines BX in FIG. 4 and the second up-shifting pattern illustrated by the dot-dashed lines BY in FIG. 4.

The controller 72 is, for example, configured to control the first transmission device 52 so that the first transmission device 52 and the second transmission device 54 perform a second down-shifting action following the second down-shifting pattern if the controller 72 receives the first shifting signal in a case where the combination of one of the first rotational bodies 34 and one of the second rotational bodies 36 becomes a predetermined combination in the second mode. The controller 72 is, for example, configured to control the first transmission device 52 so that the first transmission device 52 and the second transmission device 54 perform a second up-shifting action following the second up-shifting pattern if the controller 72 receives the first shifting signal in a case where the combination of one of the first rotational bodies 34 and one of the second rotational bodies 36 becomes a predetermined combination in the second mode. The controller 72 is, for example, configured to restrict shifting actions that are performed successively in a case where the second operation is executed in the second mode.

The controller 72 can be configured to function in only one of the first mode and the second mode. The controller 72 can be configured to function in the first mode and the second mode, and can be configured to select one of the first mode and the second mode. The controller 72 can be configured to be able to select a third mode for executing the second operation following both of the first shifting pattern and the second shifting pattern. In the third mode, for example, in a case where the second operating unit 60 is operated, the controller 72 controls at least one of the first transmission device 52 and the second transmission device 54 so that the at least one of the first transmission device 52 and the second transmission device 54 performs a shifting action following the first shifting pattern. In the third mode, for example, in a case where the first operating unit 58 is operated, the controller 72 controls at least one of the first transmission device 52 and the second transmission device 54 so that the at least one of the first transmission device 52 and the second transmission device 54 performs a shifting action following the second shifting pattern.

The controller 72 can be configured to be able to switch the first mode between an on state and an off state. In a case where the first mode is in the off state, the controller 72 shifts the speed stage of the second transmission device 54 by one stage if the second operating unit 60 is operated. The controller 72 can be configured to be able to switch the second mode between an on state and an off state. In a case where the second mode is in the off state, the controller 72 shifts the speed stage of the first transmission device 52 by one stage if the first operating unit 58 is operated. The third mode, for example, corresponds to a case in which the first mode is in the on state and the second mode is in the on state.

In a case where the controller 72 has both the first transmission device 52 and the second transmission device 54 perform a shifting action in the first mode or the second mode, the controller 72 is, for example, configured to control the first transmission device 52 and the second transmission device 54 so that one of the first transmission device 52 and the second transmission device 54 performs a shifting action and then the other one of the first transmission device 52 and the second transmission device 54 performs a shifting action. In a case where the controller 72 has both the first transmission device 52 and the second transmission device 54 perform a shifting action in the first mode or the second mode, the controller 72 is, for example, configured to control the first transmission device 52 and the second transmission device 54 so that after one of the first transmission device 52 and the second transmission device 54 completes a shifting action, the other one of the first transmission device 52 and the second transmission device 54 starts a shifting action.

In a case where the controller 72 is able to execute one of the first operation and the second operation, the controller 72 is, for example, configured to be able to restrict execution of the other one of the first operation and the second operation. A case where the controller 72 is able to restrict execution of the other one of the first operation and the second operation includes, for example, a case where the controller 72 reduces the execution frequency of the other one of the first operation and the second operation and a case where the controller 72 does not execute the other one of the first operation and the second operation.

In a case where, for example, the controller 72 is able to execute the first operation, the controller 72 is configured to be able to restrict execution of the second operation. In a case where, for example, the controller 72 is able to execute the first operation, the controller 72 is configured to be able to selectively restrict execution of the second operation and permit execution of the second operation. A case where the controller 72 is able to restrict execution of the second operation includes, for example, a case where the controller 72 reduces the execution frequency of the second operation and a case where the controller 72 does not execute the second operation. A case where the controller 72 is able to execute the first operation and also able to execute the second operation includes, for example, at least one of a case where the controller 72 permits execution of the second operation in the first mode and a case where the controller 72 permits execution of the second operation in the second mode. A case where the controller 72 is able to execute the first operation and able to restrict the second operation includes, for example, at least one of a case where the controller 72 restricts execution of the second operation in the first mode and a case where the controller 72 restricts execution of the second operation in the second mode.

In a case where the controller 72 is able to execute the first operation, the controller 72 can be configured to be able to selectively restrict execution of the second operation and permit execution of the second operation based on a first predetermined condition. The first predetermined condition includes, for example, at least one of a first condition and a second condition. The first condition, for example, differs from the second condition. For example, in a case where the first condition is satisfied, the second condition is not satisfied. In a case where the second condition is satisfied, the first condition is not satisfied. The first condition and the second condition can have a mutually exclusive relationship.

In a case where, for example, the controller 72 is able to execute the first operation, the controller 72 is configured to be able to restrict execution of the second operation based on the first condition. In a case where, for example, the controller 72 is able to execute the first operation, the controller 72 restricts execution of the second operation if the first condition is satisfied. The first condition includes, for example, at least one of the traveling state and operational state of the human-powered vehicle 10. The traveling state of the human-powered vehicle 10 in the first condition includes, for example, at least one of the rotational speed of the crank axle 20 of the human-powered vehicle 10, the human driving force input to the crank axle 20, and the vehicle speed. The operational state of the human-powered vehicle 10 includes, for example, operation of an operating unit for restricting execution of the second operation. The operating unit for restricting execution of the second operation can be the operating unit 56. The operating unit for restricting execution of the second operation can be included in a cycle computer, a personal computer, a smartphone, or a tablet computer.

In a case where, for example, the controller 72 is able to execute the first operation, the controller 72 is configured to be able to permit execution of the second operation based on the first condition. In a case where, for example, the controller 72 is able to execute the first operation, the controller 72 permits execution of the second operation if the second condition is satisfied. The second condition includes, for example, at least one of the traveling state and operational state of the human-powered vehicle 10. The traveling state of the human-powered vehicle 10 in the first condition includes, for example, at least one of the rotational speed of the crank axle 20 of the human-powered vehicle 10, the human driving force input to the crank axle 20, and the vehicle speed. The operational state of the human-powered vehicle 10 includes, for example, operation of an operating unit for permitting execution of the second operation. The operating unit for permitting execution of the second operation can be the operating unit 56. The operating unit for permitting execution of the second operation can be included in a cycle computer, a personal computer, a smartphone, or a tablet computer.

In a case where, for example, the second operation is executed, the first condition is satisfied if the time of the shifting action of at least one of the first transmission device 52 and the second transmission device 54 will be a first predetermined time or longer. The first condition is satisfied, for example, in a case where the traveling state of the human-powered vehicle 10 is a traveling state in which transmission performance is low. The first condition is satisfied, for example, in at least one of a case where the rotational speed of the crank axle 20 is less than a first speed, a case where the vehicle speed is less than a first vehicle speed, and a case where the human driving force is greater than or equal to a first driving force. The first driving force can be set to vary in correspondence with the rotational speed of the crank axle 20.

In a case where, for example, the second operation is executed, the second condition is satisfied if the time of the shifting action of at least one of the first transmission device 52 and the second transmission device 54 will be a second predetermined time or shorter. The second predetermined time is, for example, shorter than or equal to the first predetermined time. The second condition is satisfied, for example, in a case where the traveling state of the human-powered vehicle 10 is a traveling state in which the transmission performance is high. The second condition is satisfied, for example, in at least one of a case where the rotational speed of the crank axle 20 is greater than or equal to a second speed, a case where the vehicle speed is greater than or equal to a second vehicle speed, and a case where the human driving force is less than a second driving force. The second driving force can be set to vary in correspondence with the rotational speed of the crank axle 20. The second speed is, for example, greater than or equal to the first speed. The second vehicle speed is, for example, greater than or equal to the first vehicle speed. The second driving force is, for example, less than or equal to the first driving force.

In a case where, for example, the controller 72 is able to execute the first operation, the controller 72 is configured to be able to selectively restrict execution of the second operation and permit execution of the second operation based on a signal from an operating unit operable by a user. The signal from an operating unit operable by a user corresponds to, for example, the first predetermined condition. The operating unit operable by the user is, for example, the operating unit 56. In a case where, for example, a predetermined operation is performed on the operating unit 56 to select restriction of execution of the second operation or permission of execution of the second operation, the controller 72 switches between restriction and permission of execution of the second operation. The operating unit operable by the user can be included in a cycle computer, a personal computer, a smartphone, or a tablet computer.

In a case where, for example, the controller 72 is able to execute the first operation, the controller 72 can be configured to be able to selectively restrict execution of the second operation and permit execution of the second operation in accordance with whether the transmission ratio is decreased or increased. The controller 72 is, for example, configured to permit execution of the second operation in a case where execution of the second operation will decrease the transmission ratio. A case where the transmission ratio is decreased through execution of the second operation corresponds to, for example, the second condition. In a case where, for example, the controller 72 is able to execute the first operation, the controller 72 is configured to permit execution of the second operation if the first shifting signal is received. In a case where, for example, the controller 72 is able to execute the first operation, the controller 72 is configured to permit execution of the second operation if the third shifting signal is received. The controller 72 is, for example, configured to restrict execution of the second operation in a case where execution of the second operation will increase the transmission ratio. A case where the transmission ratio is increased through execution of the second operation corresponds to, for example, the first condition. In a case where, for example, the controller 72 is able to execute the first operation, the controller 72 is configured to restrict execution of the second operation if the second shifting signal is received. In a case where, for example, the controller 72 is able to execute the first operation, the controller 72 is configured to restrict execution of the second operation if the fourth shifting signal is received.

In a case where, for example, the controller 72 is able to execute the first operation, the controller 72 can be configured to be able to selectively restrict execution of the second operation and permit execution of the second operation in accordance with the moving direction of the first transmission device 52. The controller 72 is, for example, configured to permit execution of the second operation in a case where execution of the second operation will cause the first transmission device 52 to perform a shifting action that moves the first transmission device 52 toward the human-powered vehicle 10. A case where the shifting action of the first transmission device 52 moves the first transmission device 52 toward the human-powered vehicle 10 is, for example, a case where the first transmission device 52 decreases the transmission ratio. A case where execution of the second operation will cause the first transmission device 52 to perform a shifting action that moves the first transmission device 52 toward the human-powered vehicle 10 corresponds to, for example, the second condition. The controller 72 is, for example, configured to restrict execution of the second operation in a case where execution of the second operation will cause the first transmission device 52 to perform a shifting action that moves the first transmission device 52 away from the human-powered vehicle 10. A case where the shifting action of the first transmission device 52 moves the first transmission device 52 away from the human-powered vehicle 10 is, for example, a case where the first transmission device 52 increases the transmission ratio. A case where the transmission ratio is increased through execution of the second operation corresponds to, for example, the first condition.

In a case where, for example, the controller 72 is able to execute the first operation, the controller 72 can be configured to be able to selectively restrict execution of the second operation and permit execution of the second operation in accordance with the movement of the first transmission device 52 and the second transmission device 54. The controller 72 is configured to permit execution of the second operation in a case where, for example, in the second operation, the first transmission device 52 does not perform a shifting action and the second transmission device 54 performs a shifting action. A case where the first transmission device 52 does not perform a shifting action and the second transmission device 54 performs a shifting action in the second operation, for example, corresponds to the second condition. The controller 72 is configured to restrict execution of the second operation in a case where, for example, in the second operation, the first transmission device 52 and the second transmission device 54 both perform a shifting action. A case where the first transmission device 52 and the second transmission device 54 both perform a shifting action in the second operation, for example, corresponds to the first condition. The controller 72 is configured to permit execution of the second operation if, for example, the first mode is selected in a case where there is a shifting request for having only the second transmission device 54 perform a shifting action following the first shifting pattern. The controller 72 is configured to restrict execution of the second operation if, for example, the first mode is selected in a case where there is a shifting request for having the first transmission device 52 and the second transmission device 54 perform a shifting action following the first shifting pattern. The controller 72 is configured to permit execution of the second operation if, for example, the second mode is selected in a case where there is a shifting request for having only the first transmission device 52 perform a shifting action following the second shifting pattern. The controller 72 is configured to restrict execution of the second operation if, for example, the second mode is selected in a case where there is a shifting request for having the first transmission device 52 and the second transmission device 54 perform a shifting action following the second shifting pattern.

In a case where, for example, the controller 72 is able to execute the first operation, the controller 72 can be configured to selectively restrict execution of the second operation and permit execution of the second operation in accordance with the vehicle speed. The controller 72 is, for example, configured to permit execution of the second operation in a case where the vehicle speed is greater than or equal to a predetermined vehicle speed. A case where the vehicle speed is greater than or equal to the predetermined vehicle speed corresponds to, for example, the second condition. The controller 72 is, for example, configured to restrict execution of the second operation in a case where the vehicle speed is less than the predetermined vehicle speed. A case where the vehicle speed is less than the predetermined vehicle speed corresponds to, for example, the first condition. In a case where, for example, the controller 72 is able to execute the first operation in the second mode, if the vehicle speed is greater than or equal to the predetermined speed and the second mode is selected, the controller 72 is configured to permit execution of the second operation in the second mode. In a case where, for example, the controller 72 is able to execute the first operation, if the vehicle speed is greater than or equal to the predetermined speed and the first mode is selected, the controller 72 is configured to permit execution of the second operation in the first mode.

In a case where, for example, the controller 72 is able to execute the second operation, the controller 72 is configured to be able to restrict execution of the first operation. In a case where, for example, the controller 72 is able to execute the second operation, the controller 72 is configured to be able to selectively restrict execution of the first operation and permit execution of the first operation. A case where the controller 72 is able to execute the second operation includes, for example, at least one of a case where the controller 72 is able to execute at least one of the second operation in the first mode and the second operation in the second mode. A case where the controller 72 is able to restrict execution of the first operation includes, for example, a case where the controller 72 reduces the execution frequency of the first operation and a case where controller 72 does not execute the first operation.

In a case where the controller 72 is able to execute the second operation, the controller 72 can be configured to be able to selectively restrict execution of the first operation and permit execution of the first operation based on a second predetermined condition. The second predetermined condition includes, for example, at least one of a third condition and a fourth condition. The third condition, for example, differs from the fourth condition. For example, in a case where the third condition is satisfied, the fourth condition is not satisfied. In a case where the third condition is satisfied, the fourth condition is not satisfied. The third condition and the fourth condition can have a mutually exclusive relationship.

In a case where, for example, the controller 72 is able to execute the second operation, the controller 72 is configured to be able to restrict execution of the first operation based on the third condition. In a case where, for example, the controller 72 is able to execute the second operation, the controller 72 restricts execution of the first operation if the third condition is satisfied. The third condition includes, for example, at least one of the traveling state and operational state of the human-powered vehicle 10. The traveling state of the human-powered vehicle 10 in the third condition includes, for example, at least one of the rotational speed of the crank axle 20 of the human-powered vehicle 10, the human driving force input to the crank axle 20, and the vehicle speed. The operational state of the human-powered vehicle 10 includes, for example, operation of an operating unit for restricting execution of the first operation. The operating unit for restricting execution of the first operation can be the operating unit 56. The operating unit for restricting execution of the first operation can be included in a cycle computer, a personal computer, a smartphone, or a tablet computer.

In a case where, for example, the controller 72 is able to execute the second operation, the controller 72 is configured to be able to permit execution of the first operation based on the fourth condition. In a case where, for example, the controller 72 is able to execute the second operation, the controller 72 permits execution of the first operation if the fourth condition is satisfied. The fourth condition includes, for example, at least one of the traveling state and operational state of the human-powered vehicle 10. The traveling state of the human-powered vehicle 10 in the fourth condition includes, for example, at least one of the rotational speed of the crank axle 20 of the human-powered vehicle 10, the human driving force input to the crank axle 20, and the vehicle speed. The operational state of the human-powered vehicle 10 includes, for example, operation of an operating unit for permitting execution of the first operation. The operating unit for permitting execution of the first operation can be the operating unit 56. The operating unit for permitting execution of the first operation can be included in a cycle computer, a personal computer, a smartphone, or a tablet computer.

In a case where, for example, the second operation is executed, the third condition is satisfied if the time of the shifting action of at least one of the first transmission device 52 and the second transmission device 54 will be a third predetermined time or longer. The third predetermined period can be the same as or differ from the first predetermined period. The third condition is satisfied, for example, in a case where the traveling state of the human-powered vehicle 10 is a traveling state in which the transmission performance is low. The third condition is satisfied, for example, in at least one of a case where the rotational speed of the crank axle 20 is less than a third speed, a case where the vehicle speed is less than a third vehicle speed, and a case where the human driving force is greater than or equal to a third driving force. The third driving force can be set to vary in correspondence with the rotational speed of the crank axle 20. The third condition can be the same as or differ from the first condition. The third speed can be the same as or differ from the first speed. The third vehicle speed can be the same as or differ from the first vehicle speed. The third driving force can be the same as or differ from the first driving force.

In a case where, for example, the second operation is executed, the fourth condition is satisfied if the time of the shifting action of at least one of the first transmission device 52 and the second transmission device 54 will be a fourth predetermined time or shorter. The fourth predetermined time is, for example, shorter than or equal to the third predetermined time. The fourth predetermined period can be the same as or differ from the second predetermined period. The fourth condition is satisfied, for example, in a case where the traveling state of the human-powered vehicle 10 is a traveling state in which the transmission performance is high. The fourth condition is satisfied, for example, in at least one of a case where the rotational speed of the crank axle 20 is greater than or equal to a fourth speed, a case where the vehicle speed is greater than or equal to a fourth vehicle speed, and a case where the human driving force is less than a fourth driving force. The fourth driving force can be set to vary in correspondence with the rotational speed of the crank axle 20. The fourth condition can be the same as or differ from the second condition. The fourth speed is, for example, greater than or equal to the third speed. The fourth speed can be the same as or differ from the second speed. The fourth vehicle speed is, for example, greater than or equal to the third vehicle speed. The fourth vehicle speed can be the same as or differ from the second vehicle speed. The fourth driving force is less than or equal to the third driving force. The fourth driving force can be the same as or differ from the second driving force.

In a case where, for example, there is a request to set one of the first operation and the second operation, the controller 72 can be configured to permit execution of one of the first operation and the second operation and restrict execution of the other one of the first operation and the second operation. A request for execution of one of the first operation and the second operation is set, for example, in a case where the user operates a predetermined operating portion. The predetermined operating portion can be the operating unit 56 and be included in a cycle computer, a personal computer, a smartphone, or a tablet computer.

In a case where, for example, a request for execution of the first operation is set, the controller 72 is configured to permit execution of the first operation and restrict execution of the second operation. In a case where, for example, a request for execution of the first operation is set, the controller 72 is configured to permit execution of the first operation, restrict execution of the second operation in the first mode, and restrict execution of the second operation in the second mode. In a case where, for example, a request for execution of the first operation is set, the controller 72 is configured to permit execution of the first operation, restrict execution of the second operation in the first mode, and permit execution of the second operation in the second mode. In a case where, for example, a request for execution of the first operation is set, the controller 72 is configured to permit execution of the first operation, permit execution of the second operation in the first mode, and restrict execution of the second operation in the second mode.

In a case where, for example, a request for execution of the second operation is set, the controller 72 is configured to restrict execution of the first operation and permit execution of the second operation. In a case where, for example, a request for execution of the second operation in the first mode is set, the controller 72 is configured to restrict execution of the first operation and permit execution of the second operation in the first mode. In a case where, for example, a request for execution of the second operation in the second mode is set, the controller 72 is configured to restrict execution of the first operation and permit execution of the second operation in the second mode.

In a case where, for example, a setting for stopping execution of one of the first operation and the second operation is performed, the controller 72 can be configured to restrict execution of one of the first operation and the second operation and permit execution of the other one of the first operation and the second operation. In a case where, for example, a setting for stopping execution of the first operation and a setting for stopping execution of the second operation are performed, the controller 72 can be configured to restrict execution of the first operation and restrict execution of the second operation.

In Table 1, first example C1, second example C1, third example C3, fourth example C4, fifth example C5, sixth example C6, seventh example C7, and eighth example C8 are different combinations of restriction and permission conditions of the first operation, the second operation in the first mode, and the second operation in the second mode, which are selectable by the controller 72. In Table 1, a circle indicates that execution of the corresponding operation is permitted. In Table 1, a cross indicates that execution of the corresponding operation is restricted. In a case where the first operation is marked with a circle and the second operation is marked with a cross, execution of the second operation can be permitted if the second condition is satisfied. In a case where the first operation is marked with a circle and the second operation is marked with a circle, execution of the second operation can be restricted if the first condition is satisfied. In a case where the first operation is marked with a cross and the second operation is marked with a circle, execution of the first operation can be permitted if the third condition is satisfied. In a case where the first operation is marked with a circle and the second operation is marked with a circle, execution of the first operation can be restricted if the fourth condition is satisfied.

TABLE 1

|  | C1 | C2 | C3 | C4 | C5 | C6 | C7 | C8 |
|---|---|---|---|---|---|---|---|---|
| 1st Operation | ◯ | ◯ | ◯ | ◯ | X | X | X | X |
| 2nd Operation in 1st Mode | X | ◯ | X | ◯ | ◯ | X | ◯ | X |
| 2nd Operation in 2nd Mode | X | ◯ | ◯ | X | ◯ | ◯ | X | X |

Figure 5:
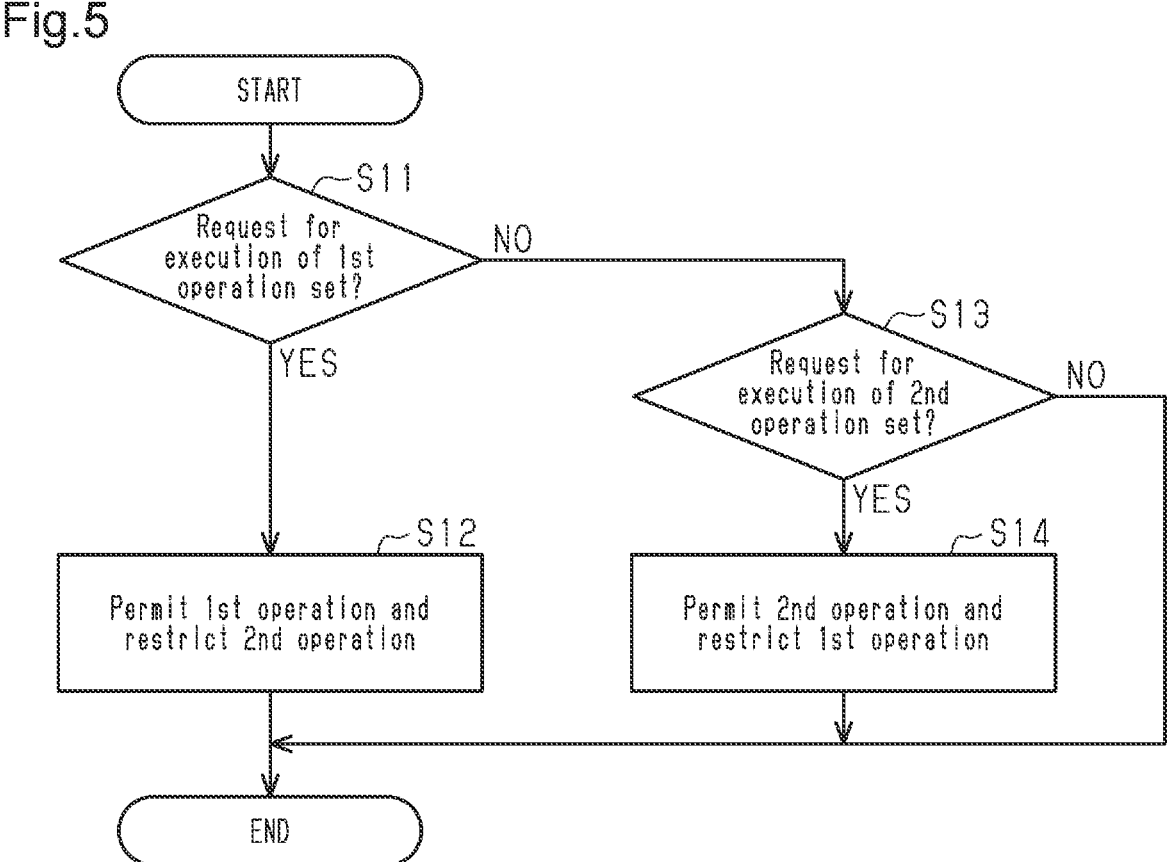
FIG. 5 is a flowchart of a process executed by the electronic controller shown in FIG. 2 to switch execution of a control state of the first operation and the second operation between a permitted state and a restricted state.

With reference to FIG. 5, a process executed by the controller 72 to switch execution of the first operation and the second operation between a permitted state and a restricted state will now be described. In a case where, for example, the controller 72 is supplied with electric power, the controller 72 starts the process and proceeds to step S11 of the flowchart illustrated in FIG. 5. Upon completion of the flowchart illustrated in FIG. 5, the controller 72 repeats the process from step S11 in predetermined cycles until, for example, the supply of electric power is stopped.

In step S11, the controller 72 determines whether a request for execution of the first operation has been set. In a case where a request for execution of the first operation has been set, the controller 72 proceeds to step S12. In step S12, the controller 72 permits execution of the first operation and restricts execution of the second operation. Then, the controller 72 ends the process. The controller 72, in step S12, for example, selects a predetermined combination from the first example C1, the third example C3, and the fourth example C4 in table 1. The controller 72 can be configured to select one of the first example C1, the third example C3, and the fourth example C4 from table 1 in step S12.

In a case where a request for execution of the first operation has not been set in step S11, the controller 72 proceeds to step S13. In step S13, the controller 72 determines whether a request for execution of the second operation has been set. In a case where a request for execution of the second operation has not been set, the controller 72 ends the process. In a case where a request for execution of the second operation has been set, the controller 72 proceeds to step S14. In step S14, the controller 72 permits execution of the second operation and restricts execution of the first operation. Then, the controller 72 ends the process. The controller 72, in step S14, for example, selects a predetermined combination from the fifth example C5, sixth example C6, and seventh example C7 in table 1. The controller 72 can be configured to select one of the fifth example C5, the sixth example C6, and the seventh example C7 from table 1 in step S14.

In a case where, for example, a request for execution of the first operation is not set and a request for execution of the second operation is not set, the controller 72 can be, for example, configured to select the eighth example C8.

With reference to FIG. 6, a process executed by the controller 72 to control the first transmission device 52, the second transmission device 54, and the motor 62 will now be described. In a case where, for example, the controller 72 is supplied with electric power, the controller 72 starts the process and proceeds to step S21 of the flowchart illustrated in FIG. 6. Upon completion of the flowchart illustrated in FIG. 6, the controller 72 repeats the process from step S21 in predetermined cycles until, for example, the supply of electric power is stopped.

In step S21, the controller 72 determines whether the shifting condition is satisfied. In a case where the shifting condition is satisfied, the controller 72 proceeds to step S22. In a case where the shifting condition is not satisfied, the controller 72 ends the process. The shifting condition is satisfied, for example, in a case where the operating unit 56 is operated. The shifting condition can be satisfied based on at least one of the traveling state and the traveling environment of the human-powered vehicle 10.

In step S22, the controller 72 determines whether to permit execution of the second operation. The controller 72, for example, determines to permit execution of the second operation if a request for execution of the second operation has been set in which case execution of the second operation is permitted. The controller 72 can determine to permit execution of the second operation in a case where the first condition is satisfied even if a request for execution of the first operation has been set thereby restricting execution of the second operation.

In a case where execution of the second operation is permitted in step S22, the controller 72 proceeds to step S23. In step S23, the controller 72 determines to move the first transmission device 52 and the second transmission device 54 through the predetermined shifting sequence and then proceeds to step S24.

In a case where, for example, in step S23, the first mode is selected and the shifting condition of the first mode is satisfied, the controller 72 determines to move the first transmission device 52 and the second transmission device 54 following the first shifting pattern. In a case where, for example, in step S23, the first mode is selected and a shifting condition differing from the shifting condition of the first mode is satisfied, the controller 72 determines to move the first transmission device 52 and the second transmission device 54 through a normal shifting sequence. The normal shifting sequence is, for example, determined based on an operation performed by the user on the first operating unit 58 and the second operating unit 60. In the normal shifting sequence, for example, operation of the first operating unit 58 changes the speed stage of the first transmission device 52 by one stage. In the normal shifting sequence, for example, operation of the second operating unit 60 changes the speed stage of the second transmission device 54 by one stage.

In a case where, for example, in step S23, the second mode is selected and the shifting condition of the second mode is satisfied, the controller 72 determines to move the first transmission device 52 and the second transmission device 54 following the second shifting pattern. In a case where, for example, in step S23, the second mode is selected and a shifting condition differing from the shifting condition of the second mode is satisfied, the controller 72 determines to move the first transmission device 52 and the second transmission device 54 through the normal shifting sequence.

In a case where execution of the second operation is not permitted in step S22, the controller 72 proceeds to step S25. In step S25, the controller 72 determines to move the first transmission device 52 and the second transmission device 54 through the normal shifting sequence and then proceeds to step S24.

In step S24, the controller 72 determines whether to permit execution of the first operation. In a case where execution of the first operation is not permitted, the controller 72 proceeds to step S26. In step S26, the controller 72 controls at least one of the first transmission device 52 and the second transmission device 54 to shift the transmission ratio and then ends the process. The controller 72, in step S26, controls the at least one of the first transmission device 52 and the second transmission device 54 through the movement of the first transmission device 52 and the second transmission device 54 determined in step S23 or step S25.

In a case where execution of the first operation is permitted in step S24, the controller 72 proceeds to step S27. The controller 72, for example, determines to permit execution of the first operation in a case where a request for execution of the first operation has been set in which case execution of the first operation is permitted. The controller 72 can determine to permit execution of the first operation in a case where the third condition is satisfied even if execution of the first operation is restricted.

In step S27, the controller 72 controls the motor 62 to change the output of the motor 62, and controls at least one of the first transmission device 52 and the second transmission device 54 to shift the transmission ratio. Then, the controller 72 proceeds to step S28. In step S27, the controller 72 controls the motor 62 to change at least one of the output of the motor 62, the upper limit value of the output of the motor 62, the assist ratio, and the response speed of the output of the motor 62 with respect to a change in the human driving force and controls the at least one of the first transmission device 52 and the second transmission device 54 to shift the transmission ratio. The controller 72, in step S27, controls the at least one of the first transmission device 52 and the second transmission device 54 through the movement of the first transmission device 52 and the second transmission device 54 determined in step S23 or step S25.

In step S28, the controller 72 determines whether a predetermined period has elapsed from the point of time at which the output of the motor 62 was changed. The predetermined period is, for example, determined in accordance with the period from initiation to completion of the shifting action performed by the at least one of the first transmission device 52 and the second transmission device 54 performed in step S27. The controller 72 repeats step S28 as long as the predetermined period from the point of time at which the output of the motor 62 was changed does not elapse. In a case where the predetermined period from the point of time at which the output of the motor 62 was changed elapses, the controller 72 proceeds to step S29. In step S29, the controller 72 controls the motor 62 to finish changing the output of the motor 62 and then ends the process.

The controller 72 can improve the transmission performance by decreasing the output of the motor 62 in the first operation. The controller 72 keeps the distance between the front sprocket 34A, around which the chain is wound, and the rear sprocket 36A, around which the chain is wound, in the sideward direction within a predetermined range during the second operation in the first mode. The controller 72 can reduce a shifting shock through the second operation in the second mode. The controller 72 is configured to be able to execute the first operation and the second operation. Thus, shifting can be performed in a preferred manner as desired by the user or in accordance with at least one of the traveling state and the traveling environment of the human-powered vehicle 10.

In a case where the first transmission device 52 and the second transmission device 54 both perform a shifting action during the second operation, there can be a case in which the first transmission device 52 and the second transmission device 54 both take a long time to complete the shifting action. In a case where the controller 72 is able to execute the first operation, the controller 72 of the present embodiment can restrict execution of the second operation. This will restrict a change in the output of the motor 62 that takes a long time.

In a case where at least one of the first transmission device 52 and the second transmission device 54 is controlled to decrease the transmission ratio, a decrease in the transmission performance will be limited even when the human driving force and the output of the motor 62 are high. In a case where the controller 72 controls at least one of the first transmission device 52 and the second transmission device 54 to decrease the transmission ratio, the amount of decrease in the output of the motor 62 can be reduced in the first operation. Thus, in a case where execution of the second operation decreases the transmission ratio, even if the first operation and the second operation are both executed, the rider will not feel any insufficiency in the propulsion force applied to the human-powered vehicle 10 by the motor 62 during the first operation. Thus, in a case where execution of the second operation decreases the transmission ratio, by executing both of the first operation and the second operation, the second execution can be executed while ensuring the transmission performance through the first operation.

In a case where the controller 72 is able to execute the first operation, the controller 72 permits execution of the second operation in a case where the first transmission device 52 will not perform a shifting action during the second operation and the second transmission device 54 will perform a shifting action during the second operation. Accordingly, if the output of the motor 62 will not be changed over a long period of time even if the first operation and the second operation are both executed, the first operation and the second operation can be executed.

The controller 72 is configured to permit execution of the second operation if the vehicle speed is greater than or equal the predetermined vehicle speed in a case where the first operation can be executed. In a case where the vehicle speed is greater than or equal to the predetermined vehicle speed, the motor 62 stops applying propulsion force to the human-powered vehicle 10. Thus, the second operation can be executed without controlling the motor 62 do decrease the output during the second operation.

In a case where the first operation is executed, during the second operation in the first mode, if a shifting action that changes the speed stage of the second transmission device 54 over a number of stages is performed, the change in output of the motor 62 can take a long period of time. In a case where the controller 72 is able to execute the first operation, the controller 72 restricts the second operation in the first mode and permits the second operation in the second mode in order to restrict changes in the output of the motor 62 over a long period of time.

Second Embodiment

Figure 7:
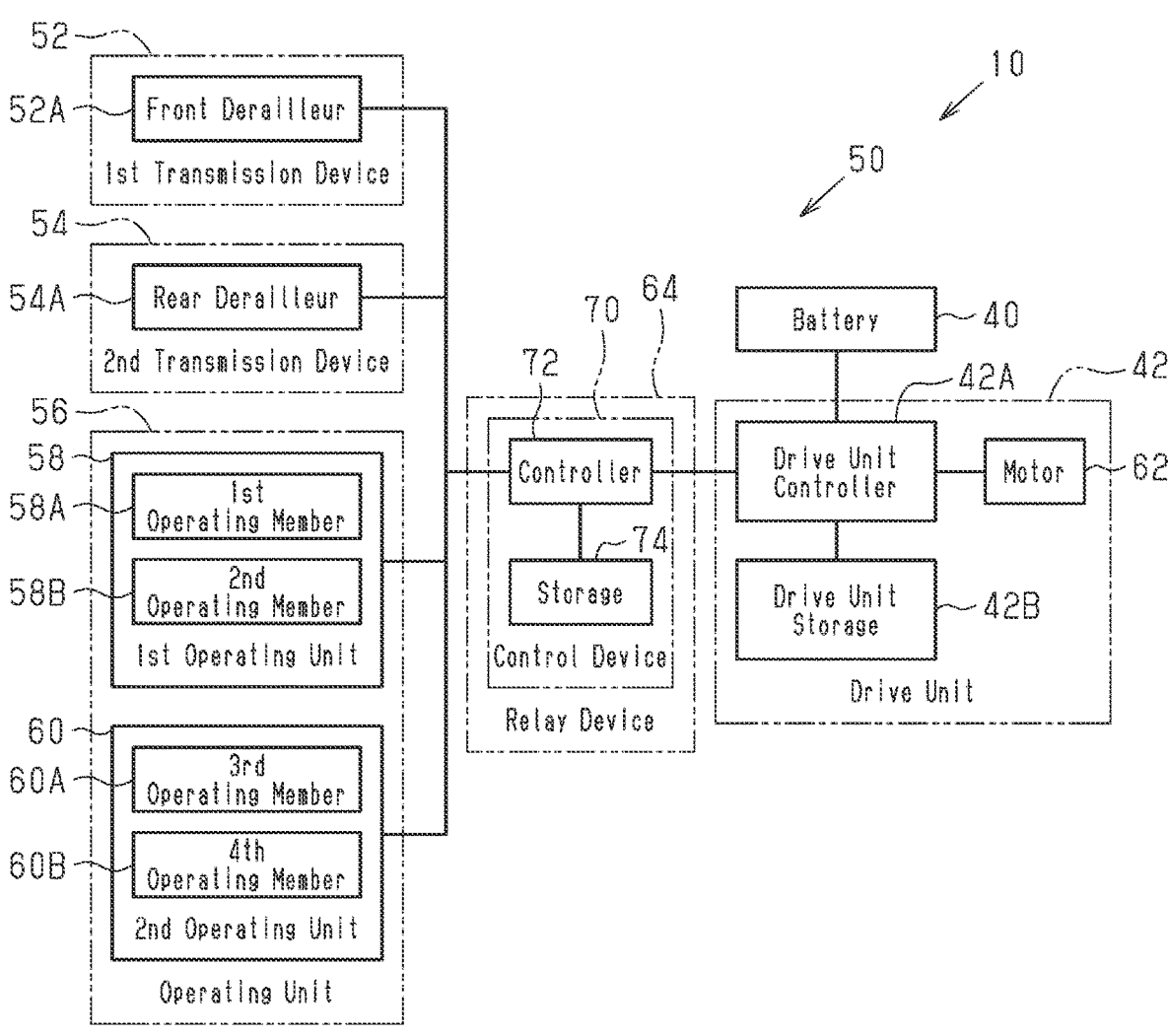
FIG. 7 is a block diagram showing the electrical configuration of a human-powered vehicle including a control device and a transmission system in accordance with a second embodiment.

With reference to FIG. 7, the control device 70 and the transmission system 50 of a second embodiment will now be described. The control device 70 and the transmission system 50 of the second embodiment are similar to the control device 70 and the transmission system 50 of the first embodiment except in where the controller 72 is located. Thus, same reference characters are given to those elements that are the same as the corresponding elements of the first embodiment. Such elements will not be described in detail.

The transmission system 50 of the present embodiment includes, for example, a relay device 64. The relay device 64 is, for example, separate from the first transmission device 52, the second transmission device 54, and the drive unit 42. The relay device 64 is provided on, for example, the frame 16. In the present embodiment, at least part of the controller 72 and at least part of the storage 74 are provided in, for example, the relay device 64.

The relay device 64 is, for example, connected to the first transmission device 52, the second transmission device 54, the first operating unit 58, the second operating unit 60, and the drive unit 42 in a manner allowing for communication. The relay device 64 is, for example, configured to communicate with the first transmission device 52, the second transmission device 54, the first operating unit 58, and the second operating unit 60 in compliance with a first communication protocol. The relay device 64 is, for example, configured to communicate with the drive unit 42 in compliance with a second communication protocol. The first communication protocol can differ from the second communication protocol or be the same as the second communication protocol. The relay device 64 is, for example, configured to be supplied with electric power via the drive unit 42 from the battery 40.

In the present embodiment, the drive unit 42 includes, for example, a drive unit controller 42A. The drive unit controller 42A includes, for example, a processor that executes predetermined control programs. The processor of the drive unit controller 42A includes, for example, a CPU or an MPU.

The drive unit 42 further includes, for example, a drive unit storage 42B. The drive unit storage 42B is, for example, connected to the drive unit controller 42A in a manner allowing for wired communication or wireless communication. The drive unit storage 42B stores, for example, control programs and information used for control processes. The drive unit storage 42B includes, for example, a nonvolatile memory and a volatile memory. The nonvolatile memory includes, for example, at least one of a ROM, an EPROM, an EEPROM, and a flash memory. The volatile memory includes, for example, a RAM.

The controller 72 provided in the relay device 64 is, for example, configured to control the motor 62 via the drive unit controller 42A. In a case where the first operation is executed, the controller 72 provided in the relay device 64 transmits information, which is related to the period during which a shifting action is performed by at least one of the first transmission device 52 and the second transmission device 54, to the drive unit controller 42A. The drive unit controller 42A is configured to control the motor 62 so as to change the output of the motor 62 in accordance with information related to the period during which a shifting action is performed by at least one of the first transmission device 52 and the second transmission device 54.

Third Embodiment

With reference to FIG. 8, the control device 70 and the transmission system 50 of the third embodiment will now be described. The control device 70 and the transmission system 50 are similar to the control device 70 and the transmission system 50 of the first embodiment except in the structure of the first transmission device 52 and the second transmission device 54. Thus, same reference characters are given to those elements that are the same as the corresponding elements of the first embodiment. Such elements will not be described in detail.

In the present embodiment, one of the first transmission device 52 and the second transmission device 54 is an internal geared hub, and the other one of the first transmission device 52 and the second transmission device 54 is a derailleur. For example, one of the first transmission device 52 and the second transmission device 54 is the front derailleur 52A or the rear derailleur 54A and the other one of the first transmission device 52 and the second transmission device 54 is a front internal geared hub or the rear internal geared hub 52B. The front internal geared hub is provided, for example, in the crank axle 20.

In the present embodiment, for example, the first transmission device 52 is the rear internal geared hub 52B provided in the hub 12A of the rear wheel 12R, and the second transmission device 54 is the rear derailleur 54A. The rear internal geared hub 52B is, for example, provided at a downstream side of the rear derailleur 54A in the power transmission path of the human driving force. For example, the rear derailleur 54A performs a shifting action after the rear internal geared hub 52B performs a shifting action.

The output shaft of the motor 62 is, for example, configured to transmit the rotational force of the motor 62 to a member located at the upstream side of the rear derailleur 54A in the power transmission path of the human driving force. The output shaft of the motor 62 can be configured to transmit the rotational force of the motor 62 to a member located at the downstream side of the rear derailleur 54A and the upstream side of the rear internal geared hub 52B in the power transmission path of the human driving force.

In a case where, for example, at least one of the rear internal geared hub 52B and the rear derailleur 54A performs a shifting action, the controller 72 is configured to be able to execute the first operation that changes the output of the motor 62. The controller 72 is, for example, configured to be able to execute the second operation for shifting the transmission ratio through a predetermined shifting sequence involving a combination of the shifting action of the rear internal geared hub 52B and a shifting action of the rear derailleur 54A.

Modifications

The description related with the above embodiments exemplifies, without any intention to limit, applicable forms of the control device 70 and the transmission system 50 according to the present disclosure. The control device 70 and the transmission system 50 according to the present disclosure is applicable to, for example, modifications of the above embodiment that are described below and combinations of at least two of the modifications that do not contradict each other. In the modifications described hereinafter, same reference numerals are given to those elements that are the same as the corresponding elements of the above embodiments. Such elements will not be described in detail.

In the third embodiment, the first transmission device 52 can be the rear derailleur 54A, and the second transmission device 54 can be the rear internal geared hub 52B. The first transmission device 52 can be the front derailleur 52A, and the second transmission device 54 can be a front internal geared hub. The first transmission device 52 can be a front internal geared hub, and the second transmission device 54 can be the front derailleur 52A. The first transmission device 52 can be the rear derailleur 54A, and the second transmission device 54 can be a front internal geared hub. The first transmission device 52 can be a front internal geared hub, and the second transmission device 54 can be the rear derailleur 54A. The first transmission device 52 can be the front derailleur 52A, and the second transmission device 54 can be the rear internal geared hub 52B. The first transmission device 52 can be the rear internal geared hub 52B, and the second transmission device 54 can be the front derailleur 52A.

The first transmission device 52 and the second transmission device 54 can both be an internal geared hub. For example, one of the first transmission device 52 and the second transmission device 54 is the rear internal geared hub 52B, and the other one of the first transmission device 52 and the second transmission device 54 is a front internal geared hub.

At least one of the first transmission device 52 and the second transmission device 54 can include a plurality of transmissions. The transmissions are, for example, two or more of the front derailleur 52A, the rear derailleur 54A, and a front internal geared hub. In this modification, the output of the motor 62 is changed in a case where, for example, the first operation is executed so that at least one of the transmissions included in the first transmission device 52 and the second transmission device 54 performs a shifting action that shifts the transmission ratio. In this modification, the second operation, for example, shifts the transmission ratio through a predetermined shifting sequence involving a combination of two or more shifting actions of the first transmission device 52 and the second transmission device 54.

The controller 72, for example, can be provided on the vehicle body 14 or in the drive unit 42. In a case where the controller 72 is provided in the drive unit 42, a first controller having the functionality of part of the controller 72 can be provided in the drive unit 42, and a second controller having the functionality of another part of the controller 72 can be provided in a human-powered vehicle component other than the drive unit 42. The human-powered vehicle component other than the drive unit 42 includes, for example, at least one of the first transmission device 52, the second transmission device 54, and the operating unit 56.

The controller 72 can proceed from step S25 to step S27 without performing step S24.

The controller 72 can increase the output of the motor 62 in the first operation. If a shifting action of at least one of the first transmission device 52 and the second transmission device 54 increases the transmission ratio, the load on the rider will increase. In a case where a shifting action of at least one of the first transmission device 52 and the second transmission device 54 increases the transmission ratio during the first operation, the controller 72 increases the output of the motor 62 and assists the rider in a preferred manner so that shifting can be performed smoothly. A decrease in the transmission ratio will decrease the load on the rider. Accordingly, in a case where a shifting action of at least one of the first transmission device 52 and the second transmission device 54 decreases the transmission ratio, the load on the rider can be further decreased. Thus, shifting will be performed in a preferred manner.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, the phrase "at least one of" as used in this disclosure means "only one single choice" or "any combination of two or more choices" if the number of its choices is three or more.

Ordinal numerals such as "first" and "second" are used in this disclosure only to distinguish members from one another and are not intended to have any special meaning.

What is claimed is:

1. A control device for a human-powered vehicle, the control device comprising:

an electronic controller configured to control a motor assisting in propulsion of the human-powered vehicle, the electronic controller being configured to execute a first operation which causes an output of the motor to change when at least one of a first transmission device and a second transmission device performs a shifting action for shifting a transmission ratio of the human-powered vehicle;

the electronic controller is configured to execute a second operation which causes the transmission ratio to shift through a predetermined shifting sequence involving a combination of the shifting action of the first transmission device and the shifting action of the second transmission device; and the electronic controller is configured to restrict execution of one of the first operation and the second operation in a case where the electronic controller is configured to execute the other one of the first operation and the second operation.

2. The control device according to claim 1, wherein the electronic controller is configured to restrict execution of the second operation in a case where the electronic controller is configured to execute the first operation.

3. The control device according to claim 2, wherein the electronic controller is configured to restrict execution of the second operation based on a first condition in a case where the electronic controller is configured to execute the first operation.

4. The control device according to claim 3, wherein the first condition includes at least one of a traveling state and an operating state of the human-powered vehicle; and the traveling state of the human-powered vehicle includes at least one of a rotational speed of a crank axle of the human-powered vehicle, a human driving force input to the crank axle, and a vehicle speed.

5. The control device according to claim 1, wherein the electronic controller is configured to permit execution of the second operation based on a second condition in a case where the electronic controller is configured to execute the first operation.

6. The control device according to claim 5, wherein the second condition includes at least one of a traveling state and an operating state of the human-powered vehicle; and the traveling state of the human-powered vehicle includes at least one of a rotational speed of a crank axle of the human-powered vehicle, a human driving force input to the crank axle, and a vehicle speed.

7. The control device according to claim 1, wherein the electronic controller is configured to selectively restrict execution of the second operation and permit execution of the second operation based on a signal from an operating unit operable by a user in a case where the electronic controller is configured to execute the first operation.

8. The control device according to claim 1, wherein
the electronic controller is configured to selectively restrict execution of the second operation and permit execution of the second operation in a case where the electronic controller is configured to execute the first operation; and
the electronic controller is configured to permit execution of the second operation in a case where the second operation is executed to decrease the transmission ratio.

9. The control device according to claim 8, wherein
the first transmission device is a front derailleur; and
the electronic controller is configured to permit execution of the second operation in a case where execution of the second operation will cause the first transmission device to perform a shifting action that moves the first transmission device toward the human-powered vehicle.

10. The control device according to claim 8, wherein
the electronic controller is configured to permit execution of the second operation in a case where, in the second operation, the first transmission device does not perform a shifting action and the second transmission device performs a shifting action.

11. The control device according to claim 1, wherein
one of the first transmission device and the second transmission device is an internal geared hub; and
the other one of the first transmission device and the second transmission device is a derailleur.

12. The control device according to claim 11, wherein
the first transmission device is a rear internal geared hub configured to be provided in a hub of a rear wheel; and
the second transmission device is a rear derailleur.

13. The control device according to claim 1, wherein
the electronic controller is configured to selectively restrict execution of the second operation and permit execution of the second operation in a case where the electronic controller is configured to execute the first operation; and
the electronic controller is configured to permit execution of the second operation in a case where a vehicle speed is greater than or equal to a predetermined vehicle speed.

14. The control device according to claim 13, wherein
the electronic controller is configured to control the motor so that the motor stops in a case where the vehicle speed is greater than or equal to the predetermined vehicle speed.

15. A transmission system for a human-powered vehicle, the transmission system comprising:
the first transmission device;
the second transmission device; and
the control device according to claim 1.

16. A transmission system for a human-powered vehicle, the transmission system comprising:
a first transmission device;
a second transmission device;
a motor configured to assist in propulsion of the human-powered vehicle; and
an electronic controller configured to control the motor,
the electronic controller being configured to execute a first operation which causes an output of the motor to change when at least one of the first transmission device and the second transmission device performs a shifting action for shifting a transmission ratio of the human-powered vehicle;
the electronic controller being configured to execute a second operation which causes the transmission ratio to shift through a predetermined shifting sequence involving a combination of the shifting action of the first transmission device and the shifting action of the second transmission device; and
the electronic controller is configured to restrict execution of one of the first operation and the second operation in a case where the electronic controller is configured to execute the other one of the first operation and the second operation.

17. The transmission system according to claim 16, wherein
the first transmission device is a front derailleur or a rear internal geared hub configured to be provided in a hub of a rear wheel.

18. The transmission system according to claim 16, wherein
the second transmission device is a rear derailleur.

* * * * *